US 6,678,219 B1

(12) United States Patent
Hirokane et al.

(10) Patent No.: US 6,678,219 B1
(45) Date of Patent: Jan. 13, 2004

(54) MAGNETO-OPTICAL RECORDING MEDIUM HAVING A MAGNETIC FLUX FORMED LAYER

(75) Inventors: Junji Hirokane, Nara (JP); Noboru Iwata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 242 days.

(21) Appl. No.: 09/704,908

(22) Filed: Nov. 2, 2000

(30) Foreign Application Priority Data

Nov. 2, 1999 (JP) .......................................... 11-311964

(51) Int. Cl.[7] .............................................. G11B 11/00
(52) U.S. Cl. ................. 369/13.15; 369/13.38; 369/13.46
(58) Field of Search .......................... 369/13.46, 13.43, 369/13.35, 13.4, 13.48, 13.49, 13.15, 13.38; 428/64.3, 694 ML, 694 MM

(56) References Cited

U.S. PATENT DOCUMENTS

| | | | |
|---|---|---|---|
| 5,659,537 A | | 8/1997 | Hirokane et al. ......... 369/275.2 |
| 5,768,218 A | * | 6/1998 | Nakayama et al. ............ 369/13 |
| 5,777,953 A | | 7/1998 | Hirokane et al. .............. 369/13 |
| 5,889,740 A | * | 3/1999 | Nakayama et al. ............ 369/13 |
| 5,926,444 A | * | 7/1999 | Hirokane et al. ......... 369/13.41 |
| 5,939,187 A | | 8/1999 | Hirokane et al. ........... 428/332 |
| 5,982,715 A | * | 11/1999 | Mori et al. .................... 369/13 |
| 6,117,544 A | * | 9/2000 | Hirokane et al. ........... 428/336 |
| 6,147,939 A | * | 11/2000 | Takahashi et al. ............. 369/13 |
| 6,278,668 B1 | * | 8/2001 | Hirokane et al. .............. 369/13 |
| 6,400,656 B1 | * | 6/2002 | Tanase et al. ............. 369/13.43 |
| 6,430,115 B1 | * | 8/2002 | Hirokane et al. ......... 369/13.43 |

FOREIGN PATENT DOCUMENTS

| | | |
|---|---|---|
| EP | 0 592 199 A2 | 4/1994 |
| EP | 0 782 135 A2 | 7/1997 |
| EP | 0 923 073 A2 | 6/1999 |
| EP | 0 965 987 A2 | 12/1999 |
| JP | 07-262632 | 10/1995 |
| JP | 11-185312 | 7/1999 |

* cited by examiner

Primary Examiner—Tan Dinh
(74) Attorney, Agent, or Firm—David G. Conlin; William J. Daley, Jr.; Edwards & Angell, LLP

(57) ABSTRACT

Featured is a magneto-optical storage medium including: a first magnetic layer constituted by a perpendicularly magnetized film; a second magnetic layer constituted by a perpendicularly magnetized film so as to be exchange coupled to the first magnetic layer; and a third magnetic layer magnetostatically coupled to the first and second magnetic layers at elevated temperatures, magnetization of the first magnetic layer being copied to the third magnetic layer. The second magnetic layer produces a greater peak net magnetization, has a higher Curie temperature than the first magnetic layer and produces a leaking magnetic flux. The structure enhances magnetostatic coupling forces acting between the first magnetic layer and the second magnetic layer and also between the first magnetic layer and the third magnetic layer.

31 Claims, 12 Drawing Sheets

↑ TM MOMENT DIRECTION   ⇧ LEAKING MAGNETIC FLUX

↑ TM MOMENT DIRECTION   ⇧ LEAKING MAGNETIC FLUX

↑ TM MOMENT DIRECTION    ⇧ LEAKING MAGNETIC FLUX

↑ TM MOMENT DIRECTION    ⇧ LEAKING MAGNETIC FLUX

↑ TM MOMENT DIRECTION  ⇧ LEAKING MAGNETIC FLUX

↑ TM MOMENT DIRECTION  ⇧ LEAKING MAGNETIC FLUX

US 6,678,219 B1

MAGNETO-OPTICAL RECORDING MEDIUM HAVING A MAGNETIC FLUX FORMED LAYER

FIELD OF THE INVENTION

The present invention relates to magneto-optical media, such as, magneto-optical disks, magneto-optical tapes, and magneto-optical cards, that are applicable to magneto-optical recording/reproducing apparatuses.

BACKGROUND OF THE INVENTION

Some time has passed since rewritable optical storage disks were put into practical use as a first application of a magneto-optical storage medium. To delete stored data from such optical storage disks, the temperature of a part of the magneto-optical storage medium is elevated by a light beam which is emitted from a semiconductor laser and focused on that part of the magneto-optical storage medium. And then, a light beam having intensity at which data is not deleted is emitted and focused on the magneto-optical storage medium, and polarization of the reflected light is recognized, so that the stored data is reproduced.

However, in such a magneto-optical storage medium, when the magnetic recording domain has a smaller recording bit diameter and a smaller recording bit interval than the beam spot of the light beam, reproduction characteristics are degraded. This is because an adjacent recording bit enters a beam spot of a light beam focused on a target recording bit, so individual recording bits cannot be distinguished for reproduction.

Japanese Unexamined Patent Publication No. 9-180276/1997 (Tokukaihei 9-180276; published on Jul. 11, 1997; corresponding to U.S. Pat. No. 5,777,953) discloses a magneto-optical storage medium for solving the above problem. The magneto-optical storage medium includes: a magnetic reproduction layer, which exhibits in-plane magnetization at room temperature and changes to perpendicular magnetization at a critical temperature or a higher temperature; a non-magnetic intermediate layer; and a magnetic storage layer, for storing data, which is constituted by a perpendicularly magnetized film.

Further, Japanese Unexamined Patent Publication No. 9-320134/1997 (Tokukaihei 9-320134; published on Dec. 12, 1997; corresponding to U.S. Pat. No. 5,939,187) discloses a magneto-optical storage medium for improving reproduction characteristics. The magneto-optical storage medium includes: a magnetic reproduction layer, which exhibits in-plane magnetization at room temperature and changes perpendicular magnetization at a critical temperature or a higher temperature, an in-plane magnetized layer having a Curie temperature around the foregoing critical temperature, a non-magnetic intermediate layer, and a magnetic storage layer, for storing data, which is constituted by a perpendicularly magnetized film.

Furthermore, Japanese Unexamined Patent Publication No. 8-180486/1996 (Tokukaihei 8-180486; published on Jul. 12, 1996;. corresponding to U.S. Pat. No. 5,659,537) discloses a magneto-optical storage medium including: a magnetic reproduction layer which exhibits perpendicular magnetization; a non-magnetic intermediate layer; and a magnetic storage layer, for storing data, which is constituted by a perpendicularly magnetized film.

According to Tokukaihei 9-180276 and Tokukaihei 9-320134, in the magneto-optical storage medium, the magnetic reproduction layer changes to in-plane magnetization at a critical temperature or a lower temperature. Thus, the magnetic information stored in the magnetic recording domain in the magnetic storage layer is not copied to the reproduction layer, so the information is not reproduced. Meanwhile, the magnetic reproduction layer changes to perpendicular magnetization at a critical temperature or a higher temperature, the information stored in the magnetic recording domain in the magnetic storage layer is copied to the magnetic reproduction layer, and the information stored in the magnetic recording domain is reproduced. Thus, even when an adjacent recording bit enters a beam spot of a light beam focused on the magnetic reproduction layer, individual recording bits can be distinguished from one another in a reproduction process by suitably setting the reproduction power of a light beam and the critical temperature where the magnetic reproduction layer changes to perpendicular magnetization. Consequently, it is possible to achieve magnetic super-resolution reproduction whereby information stored with high density is reproducible.

Also, in the magneto-optical storage medium disclosed in Tokukaihei 8-180486, magnetic information is copied from the magnetic reproduction layer to the magnetic storage layer only in a part where temperature is elevated, and magnetic super-resolution reproduction can be realized similarly to the foregoing.

However, in recent years, optical disks with a larger storage capacity have been in demand. Hence, it has been necessary to form smaller magnetic recording domains in the magnetic storage layer, to copy the magnetic recording domains to the magnetic reproduction layer, and to perform reproduction in a stable manner.

The magnetic storage layers, disclosed in Tokukaihei 9-180276, Tokukaihei 9-320134, and Tokukaihei 8-180486, for use in magneto-optical storage media have a compensation temperature around room temperature, records and holds information, and produces a leaking magnetic flux for copying information from a magnetic recording domain in the magnetic storage layer to the magnetic reproduction layer in a reproduction process. Therefore, the Curie temperature of the magnetic storage layer is set in a range of from 225° C. and 275° C. to prevent excessive recording power. In this case, in a reproduction process, when temperature is elevated at the center of a light beam spot to around a Curie temperature, the net magnetization of the magnetic storage layer decreases around the center of the light beam spot. Thus, a leaking magnetic flux from the magnetic storage layer grows smaller so as to weaken magnetostatic coupling forces between the magnetic storage layer and the magnetic reproduction layer; hence, the information stored in a magnetic domain is not copied to the magnetic reproduction layer. Consequently, the net magnetization of the magnetic storage layer becomes extremely small according to a temperature increase, so that a reproduction power margin is narrowed, a smaller magnetic recording domain cannot be copied to the magnetic reproduction layer, and stable reproduction is not possible.

An objective of the present invention is to provide a magneto-optical storage medium and a recording method thereof, that can increase the net magnetization of the magnetic storage layer during reproduction and reproduce data stored in a small magnetic recording domain in a stable manner.

SUMMARY OF THE INVENTION

A magneto-optical storage medium in accordance with the present invention, to achieve the foregoing objective, includes:

a reproduction layer which exhibits in-plane magnetization at room temperature and changes perpendicular magnetization at a temperature equal to, or higher than, a predetermined temperature;

a storage layer, for storing magnetic information, which is magnetostatically coupled to the reproduction layer; and a magnetic flux forming layer for producing a leaking magnetic flux so as to be magnetostatically coupled to the reproduction layer, the magnetic flux forming layer being exchange coupled to the storage layer.

According to the magneto-optical storage medium, magnetostatic coupling is established during a reproduction process by the leaking magnetic flux arising from the storage layer and the perpendicular magnetization of the reproduction layer and copies the magnetic information in the storage layer to the reproduction layer. Therefore, magnetic information can be reproduced only from a part of the reproduction layer where temperature is equal to, or higher than, the predetermined temperature. This enables magnetic super-resolution reproduction whereby magnetic information stored with high density is reproducible.

Incidentally, if a storage layer plays dual roles of storing information and of producing a leaking magnetic flux to establish magnetostatic coupling, as is the case with conventional disks, the net magnetization in the storage layer decreases with an increase in the reproduction power during a reproduction process. As a result, the storage layer fails to produce a sufficiently large leaking magnetic flux, which weakens the magnetostatic coupling between the storage layer and the reproduction layer. This disables stable reproduction and results in a narrow reproduction power margin.

In contrast, the magneto-optical storage medium includes a magnetic flux forming layer which is exchange coupled to the storage layer and which also produces a leaking magnetic flux so as to be magnetostatically coupled to the reproduction layer. This enables the magnetic flux forming layer exchange coupled to the storage layer to produce a leaking magnetic flux, despite the fact that the storage layer loses some of its net magnetization with an increase in the reproduction power. Therefore, the magnetostatic coupling established by the leaking magnetic flux arising from the magnetic flux forming layer ensures the copying of the magnetic information in the storage layer to the reproduction layer. Consequently, an increase in the reproduction power does not disturb stable reproduction and does not lead to a narrow reproduction power margin.

For a fuller understanding of the nature and advantages of the invention, reference should be made to the ensuing detailed description taken in conjunction with the accompanying drawings.

DESCRIPTION OF THE EMBODIMENTS

[Embodiment 1]

Referring to FIGS. 1 to 7, the following explanation describes one embodiment of the present invention.

Figure 1:
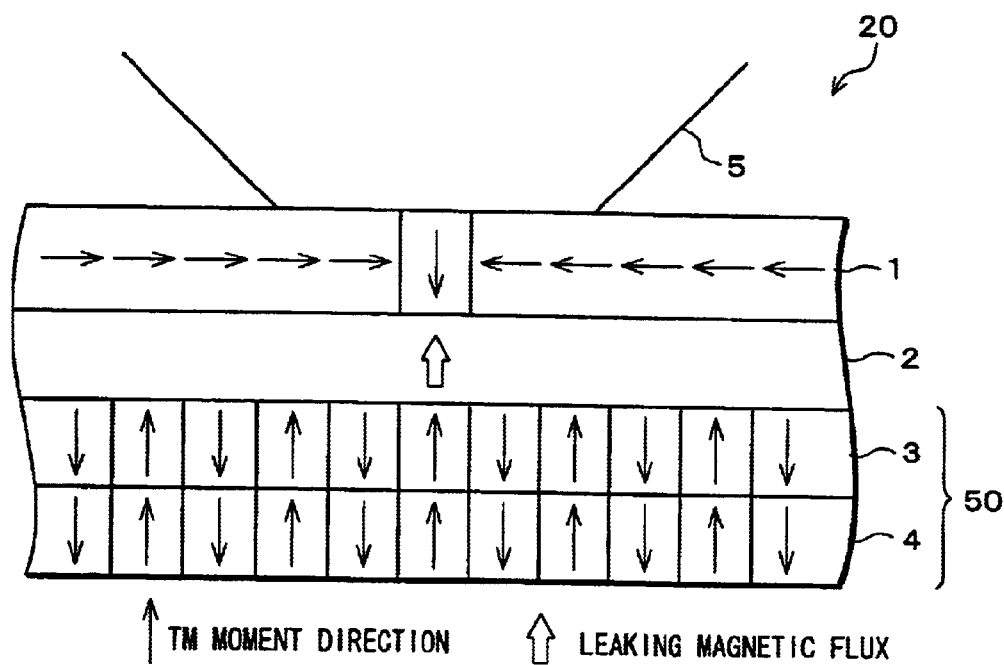
FIG. 1 is a cross-sectional view showing magnetization to illustrate reproduction principles of a super-resolution magneto-optical storage medium of an embodiment in accordance with the present invention.

FIG. 1 is an explanatory drawing showing, in a cross-sectional view, the magnetization of a super-resolution magneto-optical storage medium 20 according to one embodiment of the present invention. The super-resolution magneto-optical storage medium 20 changes to in-plane magnetization at room temperature. A reproduction layer 1 (third magnetic layer) which exhibits perpendicular magnetization at a critical temperature and higher temperatures, a non-magnetic intermediate layer 2, a magnetic flux forming layer 3 (second magnetic layer) whose compensation temperature is substantially equal to room temperature, and a storage layer 4 (first magnetic layer) for storing information are stacked in this order (hereinafter, the magnetic flux forming layer 3 and the storage layer 4 are collectively referred to as a storage layer body 50). Here, the reproduction layer 1 changes from in-plane magnetization to perpendicular magnetization, and therefore is preferably RE-rich (a rare-earth metal is dominant) at least at room temperature.

Additionally, the magnetic flux forming layer 3 and the storage layer 4 are exchange coupled to each other, and the reproduction layer 1 is magnetostatically coupled to the magnetic flux forming layer 3 and the storage layer 4.

In the super-resolution magnetic storage medium 20 configured as above, the reproduction layer 1 becomes magnetostatically coupled to the magnetic flux forming layer 3 and the storage layer 4 through the magnetization of the reproduction layer 1, which has now changed to perpendicular magnetization, and the leaking magnetic fluxes arising from the magnetic flux forming layer 3 and the storage layer 4, so that the magnetic information in the storage layer 4 is copied to the reproduction layer 1. With this arrangement, magnetic super-resolution reproduction can be achieved, in which a light beam 5 reproduces magnetic information only in a part where temperature is equal to, or higher than, its critical temperature.

Figure 2:
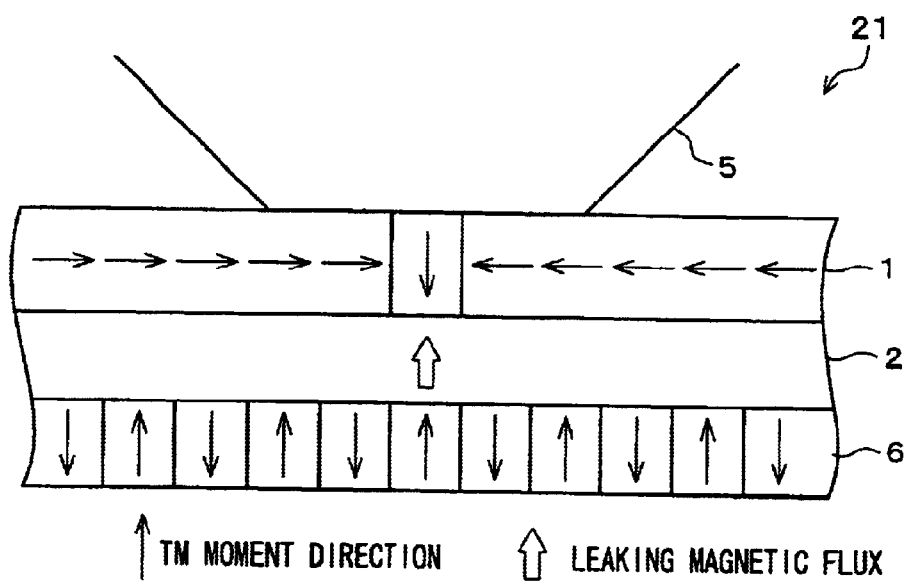
FIG. 2 is a cross-sectional view showing magnetization to illustrate reproduction principles of a conventional super-resolution magneto-optical storage medium.

FIG. 2 is an explanatory drawing showing, in a cross-sectional view, the magnetization of a conventional super-resolution magneto-optical storage medium 21. The super-resolution magneto-optical storage medium 21 is identical to the super-resolution magneto-optical storage medium 20, except that the former does not include a magnetic flux forming layer 3 or a storage layer 4, but includes a storage layer 6. Explanation is omitted of members that have the same function as those in the super-resolution magneto-optical storage medium 20. The same magnetic films as in the super-resolution magneto-optical storage medium 20 of the present embodiment are adopted as the reproduction layer 1 and the non-magnetic layer 2. Further, the storage layer 6 plays dual roles of storing information and of producing a leaking magnetic flux for magnetostatic coupling. Therefore, the storage layer 6 of the super-resolution magneto-optical storage medium 21 needs to produce a leaking magnetic flux, which can maintain stable magnetostatic coupling to the reproduction layer 1, and to achieve preferable recording characteristics.

Figure 3:
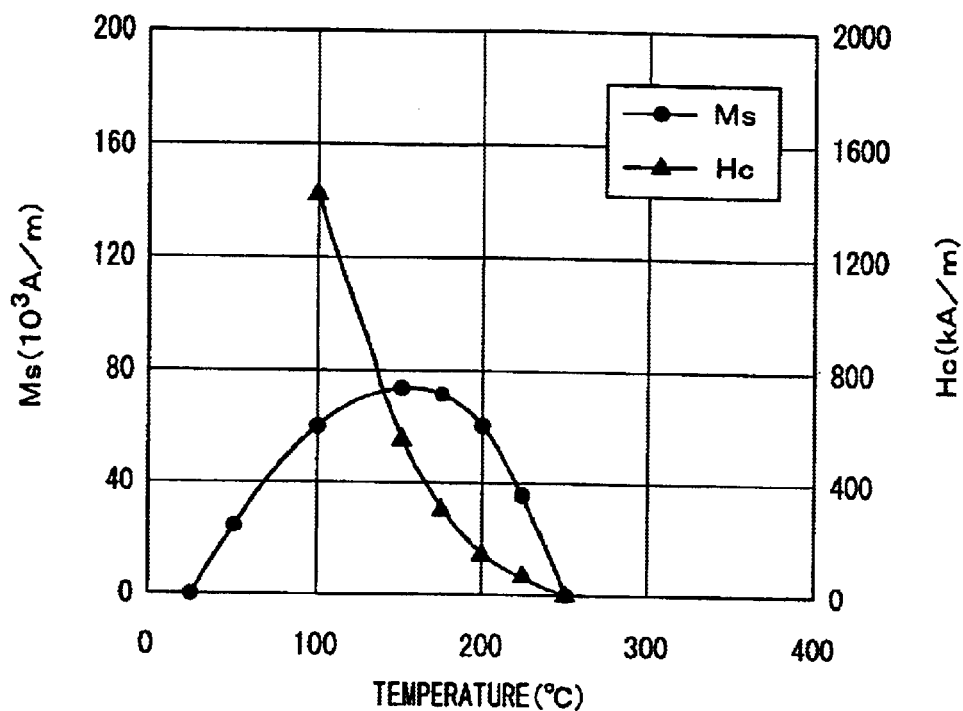
FIG. 3 is a graphical representation showing, as an example, magnetic properties of a storage layer in a conventional super-resolution magneto-optical storage medium.

FIG. 3 shows the dependence on temperature of the coercive force Hc and the net magnetization Ms of the storage layer 6, which is used in the super-resolution magneto-optical storage medium 21 and is made of $Tb_{0.24}(Fe_{0.85}Co_{0.15})_{0.76}$ with a thickness of 40 nm. In this case, the Curie point is 250° C., and the coercive force Hc rapidly decreases according to a temperature rise and becomes 0 at the Curie point. Hence, a magnetic domain recorded at the Curie point is maintained in a stable manner while temperature decreases, achieving preferable recording characteristics. However, in a reproduction process, when the storage layer 6 has a temperature of 150° C. or higher due to an increase in the reproduction power, the net magnetization Ms in the storage layer 6 decreases particularly in a part having a maximum temperature in an area receiving a light beam. Accordingly, it is found that the leaking magnetic flux arising from the storage layer 6 is reduced. For these reasons, magnetostatic coupling is weakened between the reproduction layer 1 and the storage layer 6, thus preventing stable reproduction. Namely, a larger reproduction power prevents stable reproduction, so that a reproduction power margin is narrowed.

Figure 4:
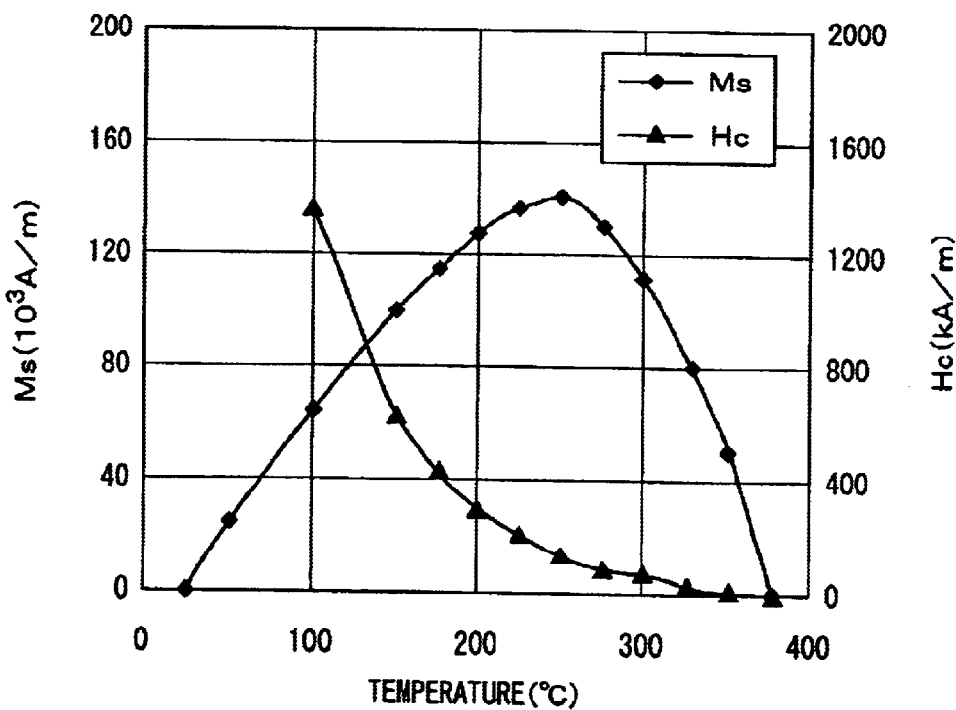
FIG. 4 is a graphical representation showing, as an example, magnetic properties of a storage layer in a conventional super-resolution magneto-optical storage medium.

FIG. 4 shows the dependence on temperature of the coercive force Hc and the net magnetization Ms of the storage layer 6, having a thickness of 40 nm, which is made of $Tb_{0.24}(Fe_{0.60}Co_{0.40})_{0.76}$ having a larger content of Co than $Tb_{0.24}(Fe_{0.85}Co_{0.15})_{0.76}$ of FIG. 3. Regarding an amorphous thin film of an alloy of rare-earth (RE) and transition metals (TMs), a Co content in the transition metal is relatively high so as to increase the Curie temperature. In this case, the peak value of the net magnetization Ms is $1.4 \times 10^5$ A/m (140 emu/cc), which is larger than the peak value ($0.7 \times 10^5$ A/m) of the net magnetization Ms of $Tb_{0.24}(Fe_{0.85}Co_{0.15})_{0.76}$ shown in FIG. 3. Additionally, the net magnetization Ms has a peak value at 250° C. Hence, it is understood that when $Tb_{0.24}(Fe_{0.85}CO_{0.15})_{0.76}$ of FIG. 4 is used as the storage layer 6, stable magnetostatic coupling can be maintained at high temperatures and a broader reproduction power margin can be achieved as compared with the storage layer 6 made of $Tb_{0.24}(Fe_{0.85}Co_{0.15})_{0.76}$ in FIG. 3. However, $Tb_{0.24}(Fe_{0.85}CO_{0.15})_{0.76}$ of FIG. 4 has a high Curie temperature of 380° C. and maintains a large coercive force of 40 kA/m (500 Oe) or greater even at 300° C., so that a high recording laser power is necessary for recording.

Generally, in order to obtain a preferable recording sensitivity, the recording temperature (in this case, a Curie temperature) is preferably set between 225° C. and 275° C. If temperature rises exceeding this range, a magnetic film and so on is deteriorated by heat so as to considerably reduce the lifespan of the storage medium. Thus, it is difficult to use $Tb_{0.24}(Fe_{0.60}Co_{0.40})_{0.76}$ of FIG. 4 as the storage layer 6.

Figure 5:
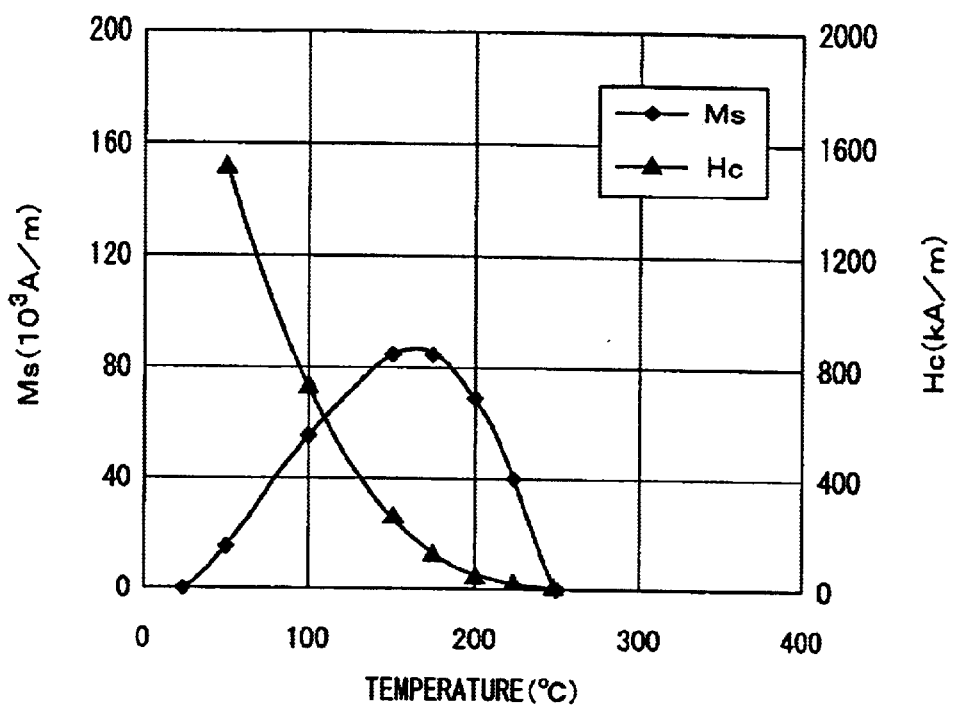
FIG. 5 is a graphical representation showing, as an example, magnetic properties of a storage layer in a conventional super-resolution magneto-optical storage medium.

Next, FIG. 5 shows the dependence on temperature of the coercive force Hc and the net magnetization Ms of the storage layer 6, which has been conventionally used and is made of $Dy_{0.23}(Fe_{0.75}Co_{0.25})_{0.77}$ with a thickness of 40 nm. DyFeCo is smaller than TbFeCo in perpendicular magnetic anisotropy, so that the coercive force Hc is smaller than that of FIG. 3. Furthermore, the net magnetization Ms and the coercive force Hc both show substantially the same dependence on temperature as FIG. 3. Like the construction of FIG. 3, the recording characteristics are preferable but a reproduction power margin is small.

Figure 6:
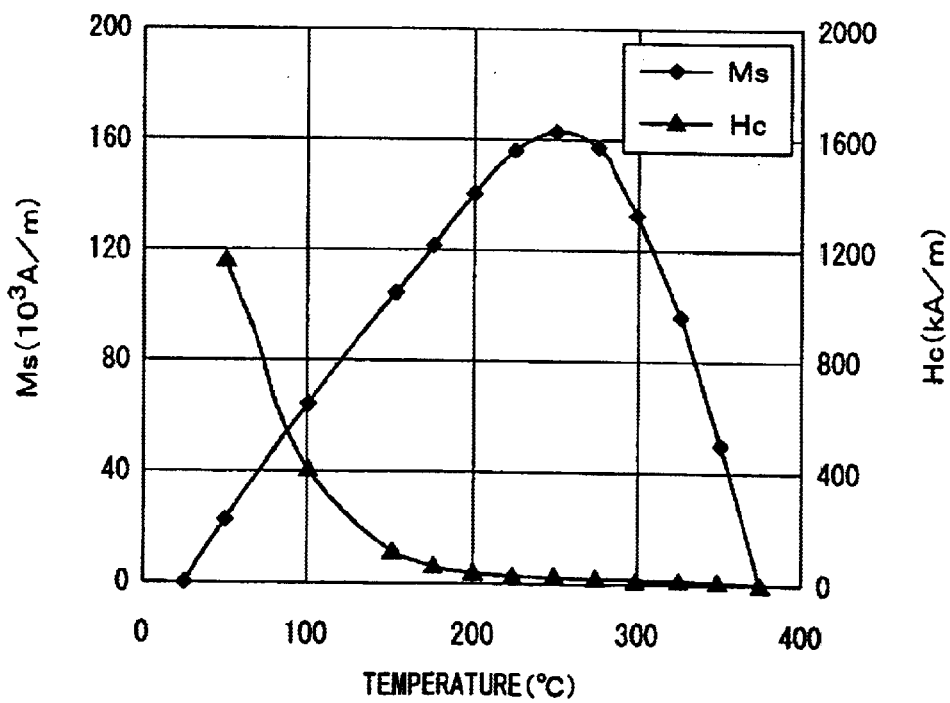
FIG. 6 is a graphical representation showing, as an example, magnetic properties of a storage layer in a conventional super-resolution magneto-optical storage medium.

FIG. 6 shows the dependence on temperature of the coercive force Hc and the net magnetization Ms of the storage layer 6, which is made of $Dy_{0.23}(Fe_{0.55}Co_{0.45})_{0.77}$ with a thickness of 40 nm. As compared with TbFeCo of FIG. 4, DyFeCo is smaller in perpendicular magnetic anisotropy. Hence, the coercive force rapidly decreases with rising temperatures, so that the coercive force Hc is 16 kA/m (200 Oe) or weaker at 200° C. or higher temperatures. Like the construction of FIG. 4, the net magnetization Ms of FIG. 6 has a high peak value of $1.6\times10^5$ A/m (160 emu/cc) at 250° C.; however, the coercive force decreases around 200° C. and the magnetic information stored cannot be maintained in a stable manner in the case of the storage layer 6. Consequently, a reproduction power margin becomes narrow.

Meanwhile, as for recording, the coercive force Hc is small at 200° C. or higher temperatures, so that the direction of magnetization can be aligned to the direction of a recording magnetic field by applying a recording magnetic field larger than the coercive force Hc at a temperature of 225° C. to 275° C., where a preferable recording sensitivity can be obtained. However, the coercive force increases only in a gradual manner while the recording magnetization direction is fixed in a temperature decreasing process; thus, a recorded magnetization direction cannot be maintained in a stable manner, so that preferable recording characteristics cannot be obtained according to a magnetic field modulation recording method. Therefore, it is difficult to use $Dy_{0.23}(Fe_{0.55}Co_{0.45})_{0.77}$ of FIG. 6 as the storage layer 6.

As mentioned above, when only the storage layer 6 of FIG. 2 produces a leaking magnetic flux for magnetostatic coupling and stores information, it is not possible to obtain satisfactory reproduction and recording characteristics.

Hence, as described above, the super-resolution magneto-optical storage medium 20 of FIG. 1 uses the magnetic flux forming layer 3 and the storage layer 4 in place of the storage layer 6.

Figure 7:
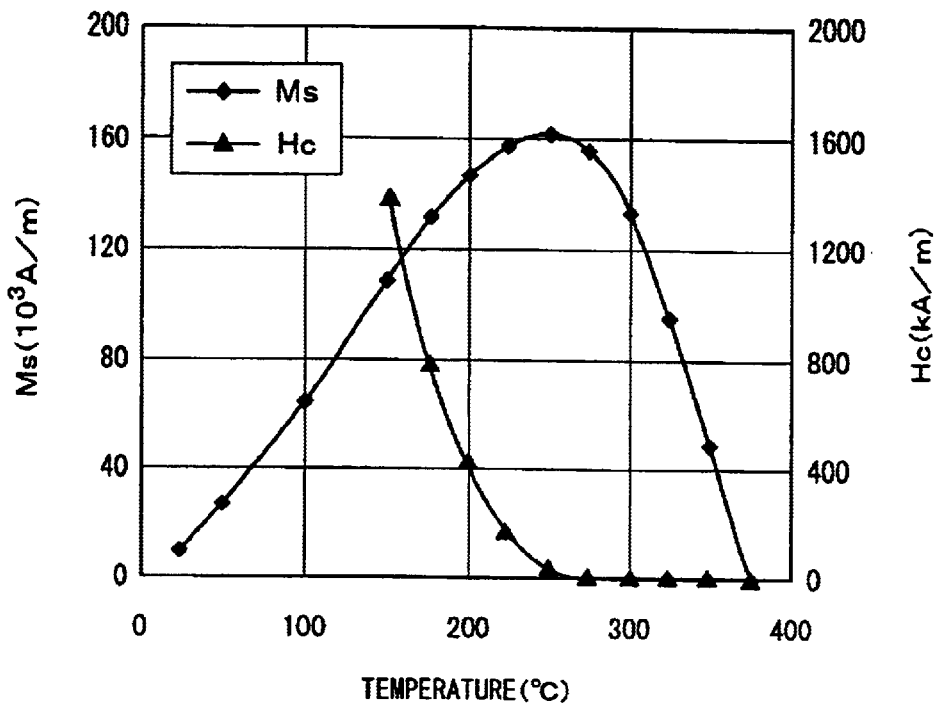
FIG. 7 is a graphical representation showing, as an example, magnetic properties of a layer structure constituted by a magnetic flux forming layer and a storage layer in the foregoing super-resolution magneto-optical storage medium.

FIG. 7 shows an example of the dependence on temperature of the net magnetization Ms and the coercive force Hc of a construction (storage layer body 50) in which the magnetic flux forming layer 3 and the storage layer 4 are stacked. Here, $Dy_{0.23}(Fe_{0.55}Co_{0.45})_{0.77}$ with a thickness of 40 nm of FIG. 6 is used as the magnetic flux forming layer 3. $Tb_{0.26}(Fe_{0.82}Co_{0.18})_{0.74}$, which has a larger content of Tb than TbFeCo of FIG. 4, with a thickness of 20 nm is used as the storage layer 4. The storage layer 4 has a compensation temperature of 100° C. and a Curie temperature of 250° C.

As for the dependence on temperature of the net magnetization Ms of the storage layer body 50, the storage layer 4 has a high compensation temperature of 100° C., so that the storage layer 4 has small magnetization around the compensation temperature. However, the storage layer body 50 shows a high peak value substantially in the same manner as DyFeCo shown in the graph of FIG. 6, causing a large leaking magnetic flux to arise from the magnetic flux forming layer 3. Thus, it is possible to increase the magnetostatic coupling forces exerted on the reproduction layer 1 and to widen the reproduction power margin.

Further, a TbFeCo thin film used as the storage layer 4 can reduce the coercive force more rapidly around the Curie temperature by increasing the content of Tb and raising the compensation temperature (to be specific, higher than room temperature). The coercive force Hc of the storage layer body 50 in FIG. 7 rapidly decreases as temperature decreases toward 250° C., which is equal to the Curie temperature of the storage layer 4. Hence, a magnetic field is applied to the storage layer 4 while heating it to its Curie temperature, so that preferable recording characteristics can be obtained. Normally, when the compensation temperature is increased, the net magnetization decreases, thereby reducing the leaking magnetic flux. However, in the case of the super-resolution magneto-optical storage medium 20 of the present invention, the magnetic flux forming layer 3 acts as a source of a leaking magnetic flux; thus, even when the net magnetization of the storage layer 4 becomes small, preferable reproduction characteristics can be obtained.

As earlier mentioned, in the magneto-optical storage medium 20 of the present embodiment, the magnetic flux forming layer 3 produces a leaking magnetic flux for magnetostatic coupling to the reproduction layer 1 and the storage layer 4 realizes a preferable recording condition; therefore, it is possible to provide a magneto-optical storage medium and a recording method thereof having preferable reproduction and recording characteristics.

Here, as earlier mentioned, the magnetic flux forming layer 3 preferably has a large peak value of net magnetization on a high-temperature area where at least the net magnetization of the storage layer 4 decreases. To attain this peak value, when the magnetic flux forming layer 3 has a Curie temperature of Tc3 and the storage layer 4 has a Curie temperature of Tc4, it is only necessary to satisfy at least Tc3>Tc4. Moreover, it is desirable that the magnetic flux forming layer 3 be larger than the storage layer 4 in peak value of net magnetization and in peak temperature.

Besides, if a leaking magnetic flux is too large at room temperature, the magnetization of the reproduction layer 1 is seriously affected. Thus, it is desirable that the magnetic flux forming layer 3 have a compensation temperature around room temperature. Therefore, a compensation temperature of the magnetic flux forming layer 3 is preferably lower than that of the storage layer 4 in view of the fact that a compensation temperature of the storage layer 4 is preferably higher than room temperature.

Also, in order to leak a magnetic flux in a stable manner and to increase a reproduction power margin on a part having a maximum temperature in an area receiving a light beam, the temperature where the net magnetization of the magnetic flux forming layer 3 is maximized is preferably higher than the critical temperature of the reproduction layer 1.

Further, FIG. 1 shows the construction in which the reproduction layer 1, the non-magnetic intermediate layer 2, the magnetic flux forming layer 3, and the storage layer 4 are stacked in this order. In this case, the order of stacking the magnetic flux forming layer 3 and the storage layer 4 can be changed. However, in order to obtain a stable magnetostatic coupling state between the reproduction layer 1 and the magnetic flux forming layer 3, it is preferable to adopt the construction of FIG. 1, in which the reproduction layer 1 and the magnetic flux forming layer 3 are stacked in the closest proximity.

[Embodiment 2]

Figure 8:
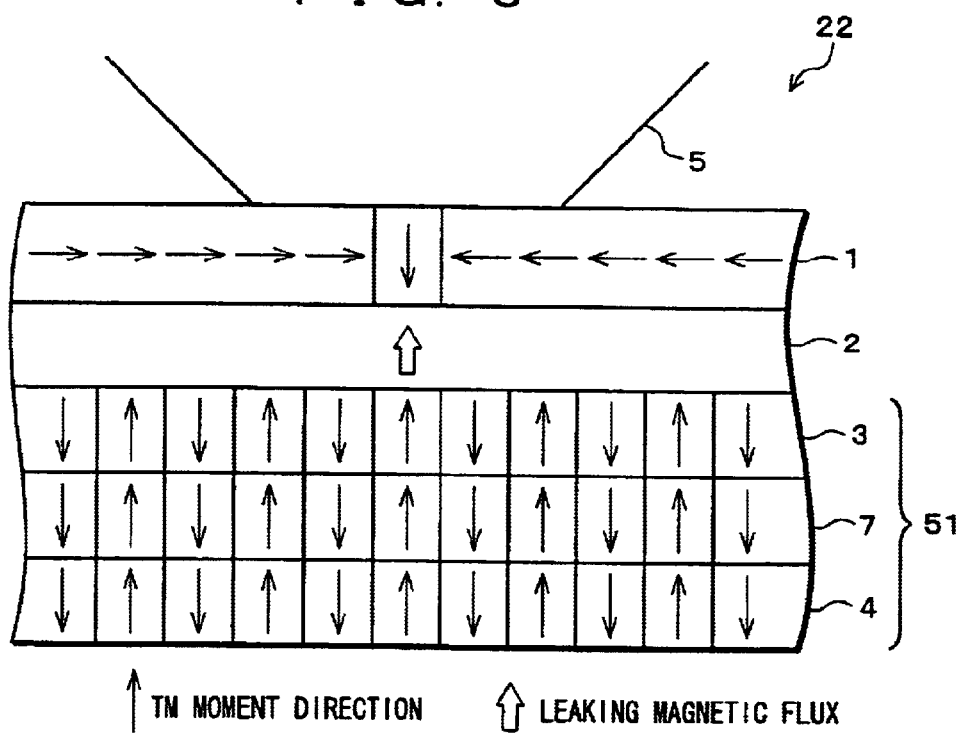
FIG. 8 is a cross-sectional view showing magnetization to illustrate reproduction principles of a super-resolution magneto-optical storage medium of embodiment 2 in accordance with the present invention.

FIG. 8 is a explanatory drawing showing, in a cross-sectional view, the magnetization of a second super-resolution magneto-optical storage medium 22 of the present invention. The super-resolution magneto-optical storage medium 22 is identical to the super-resolution magneto-optical storage medium 20, except that the former includes a supplementary storage layer 7 (fourth magnetic layer) between the magnetic flux forming layer 3 and the storage layer 4 of embodiment 1 shown in FIG. 1. Members that have the same function as those in the super-resolution magneto-optical storage medium 20 are indicated by the same reference numerals and no explanation is given to those members.

The supplementary storage layer 7 is smaller in perpendicular magnetic anisotropy than the storage layer 4 and the magnetic flux forming layer 3. At not more than a Curie temperature of the storage layer 4, exchange coupling is applied from the storage layer 4 to the supplementary storage layer 7 and then from the supplementary storage layer 7 to the magnetic flux forming layer 3, so that the storage layer 4 and the magnetic flux forming layer 3 have directions of sublattice magnetic moment in parallel.

Meanwhile, at not less than a Curie temperature of the storage layer 4, the supplementary storage layer 7 having a smaller perpendicular magnetic anisotropy establishes exchange coupling to the magnetic flux forming layer 3, so that the coercive force of the magnetic flux forming layer 3 is considerably reduced or a magnetization direction is inclined relative to a direction perpendicular to a film surface, thereby setting the coercive force substantially at 0. The coercive force of the magnetic flux forming layer 3 is reduced around the Curie temperature of the storage layer 4 or higher temperatures; thus, the magnetization of the magnetic flux forming layer 3 can be reversed in a smaller recording magnetic field, and the magnetization direction is copied to the storage layer 4 and recorded therein so as to achieve stable recording at low magnetic field strengths.

Figure 9:
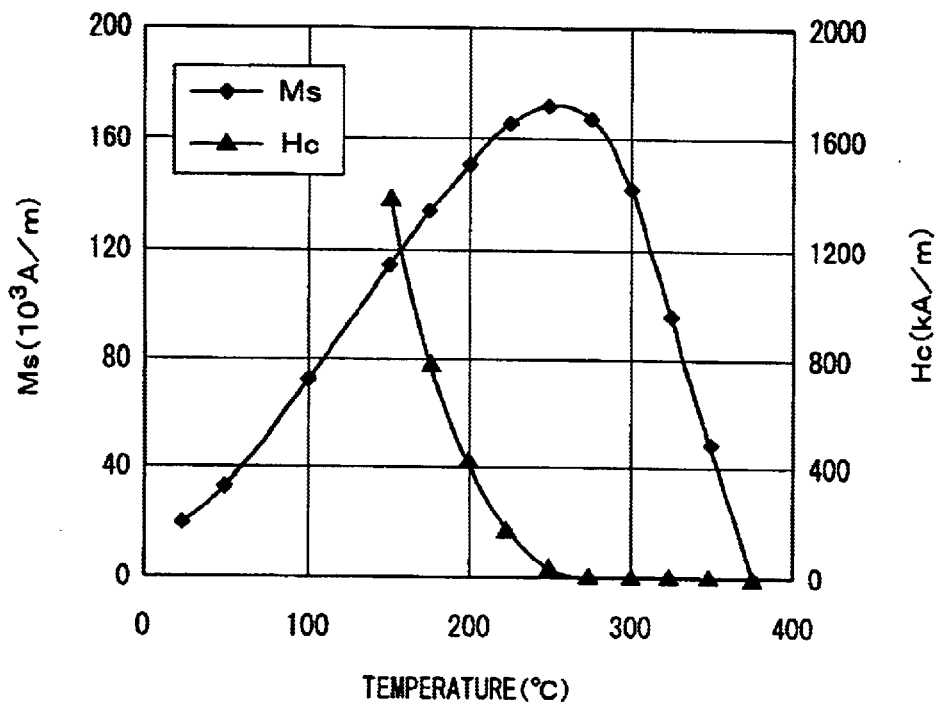
FIG. 9 is a graphical representation showing, as an example, magnetic properties of a layer structure constituted by a magnetic flux forming layer, a storage layer, and a supplementary storage layer in a super-resolution magneto-optical storage medium in accordance with the present invention.

FIG. 9 shows the dependence on temperature of the net magnetization Ms and the coercive force Hc in the super-resolution magneto-optical storage medium 22 according to Embodiment 2 of the present invention shown in FIG. 8, in which the magnetic flux forming layer 3, the second storage layer 7, and the storage layer 4 are stacked (hereinafter, referred to as a storage layer body 51). Here, $Dy_{0.23}(Fe_{0.55}Co_{0.45})_{0.77}$ with a thickness of 40 nm and $Tb_{0.26}(Fe_{0.82}Co_{0.18})_{0.74}$ with a thickness of 20 nm, which are shown in FIG. 2, are respectively used as the magnetic flux forming layer 3 and the storage layer 4. $Gd_{0.20}(Fe_{0.70}Co_{0.30})_{0.80}$ with a thickness of 10 nm is used as the supplementary storage layer 7. $Gd_{0.20}(Fe_{0.70}CO_{0.30})_{0.80}$ is used as a magnetic film which has a smaller perpendicular magnetic anisotropy than the magnetic flux forming layer 3 and has a higher Curie temperature than the storage layer 4.

In view of the dependence on the temperature of the net magnetization Ms and the coercive force Hc of FIG. 9, it is understood that like the net magnetization Ms and the coercive force Hc of the super-resolution magneto-optical storage medium 20 shown in FIG. 7, large magnetization of $1.6 \times 10^5$ A/m (160 emu/cc) or greater appears at 250° C. ($1.2 \times 10^5$ A/m (120 emu/cc or greater at 150° C. to 300° C.), a large leaking magnetic flux arises from the magnetic flux forming layer 3, and magnetostatic coupling force to the reproduction layer 1 is increased.

Moreover, regarding the net magnetization Ms and the coercive force Hc of the magneto-optical storage medium 20 shown in FIG. 7, in which the supplementary storage layer 7 is not provided, the magnetic flux forming layer 3 has a coercive force of about 16 kA/m (200 Oe) when the storage layer 4 has a Curie temperature of 250° C. or higher. A magnetic field of at least 16 kA/m (200 Oe) is necessary for recording. Regarding the net magnetization Ms and the coercive force Hc of the magneto-optical storage medium 22 shown in FIG. 9 including the supplementary storage layer 7, the coercive force of the magnetic flux forming layer 3 is substantially 0 when the storage layer 4 has a Curie temperature of 250° C. or higher, so that recording is possible at lower magnetic field strengths.

As described above, the magneto-optical storage medium 22 of the present embodiment can increase a reproduction power margin and maintain more preferable recording characteristics as compared with Embodiment 1. Additionally, as earlier mentioned, it is desirable that the magnetic flux forming layer 3 be at least larger in peak value of net magnetization than the storage layer 4. In order to obtain such a peak value, when the magnetic flux forming layer 3 has a Curie temperature of Tc3 and the storage layer 4 has a Curie temperature of Tc4, it is preferable to satisfy at least Tc3>Tc4. Further, when the supplementary storage layer 7 has a Curie temperature of Tc7, the supplementary storage layer 7 needs to be magnetized to reduce the coercive force of the magnetic flux forming layer 3 at the Curie temperature Tc4 of the storage layer 4, and at least Tc7>Tc4 needs to be satisfied.

Further, like Embodiment 1, when too large a magnetic flux leaks from the storage layer body 51 at room temperature, the magnetization of the reproduction layer 1 is seriously affected, so that the magnetic flux forming layer 3 preferably has a compensation temperature around room temperature. Besides, in order to leak a magnetic flux in a stable manner and to increase a reproduction power margin in a part having a maximum temperature in an area receiving a light beam, the temperature where the net magnetization of the magnetic flux forming layer 3 is maximized is preferably higher than the critical temperature of the reproduction layer 1.

Moreover, FIG. 8 shows the construction in which a reproduction layer 1, a non-magnetic intermediate layer 2, the magnetic flux forming layer 3, the supplementary storage layer 7, and the storage layer 4 are stacked in this order. In order to realize recording at low magnetic field strengths, it is essential only that the supplementary storage layer 7, the storage layer 4, and the magnetic flux forming layer 3 are exchange coupled. For example, the following constructions are applicable: a construction in which the reproduction layer 1, the non-magnetic intermediate layer 2, the magnetic flux forming layer 3, the storage layer 4, and the supplementary storage layer 7 are stacked in this order, and a construction in which the reproduction layer 1, the non-magnetic intermediate layer 2, the supplementary storage layer 7, the storage layer 4, and the magnetic flux forming layer 3 are stacked in this order. In order to achieve a stable magnetostatic coupling state between the reproduction layer 1 and the magnetic flux forming layer 3, it is preferable to adopt the construction of FIG. 8, in which the reproduction layer 1, the non-magnetic intermediate layer 2, the magnetic flux forming layer 3, the supplementary storage layer 7, and the storage layer 4 are stacked in this order with the closest proximity between the reproduction layer 1 and the magnetic flux forming layer 3, or the construction in which the reproduction layer 1, the non-intermediate layer 2, the magnetic flux forming layer 3, the storage layer 4, and the supplementary storage layer 7 are stacked in this order.

Here, Embodiment 2 and Embodiment 1 respectively describe the super-resolution magneto-optical storage mediums 20 and 22, in which a reproduction layer changing from in-plane magnetization to perpendicular magnetization is used as the reproduction layer 1. However, the present invention is not limited to the above arrangement. Any super-resolution magneto-optical storage medium is applicable as long as the reproduction layer and the storage layer are magnetostatically coupled to each other. For example, it is possible to adopt a super-resolution magneto-optical storage medium disclosed in Tokukaihei 8-180486, in which a perpendicularly magnetized layer is used as the reproduction layer 1 (See Example 7 described later).

[Embodiment 3]

Figure 10:
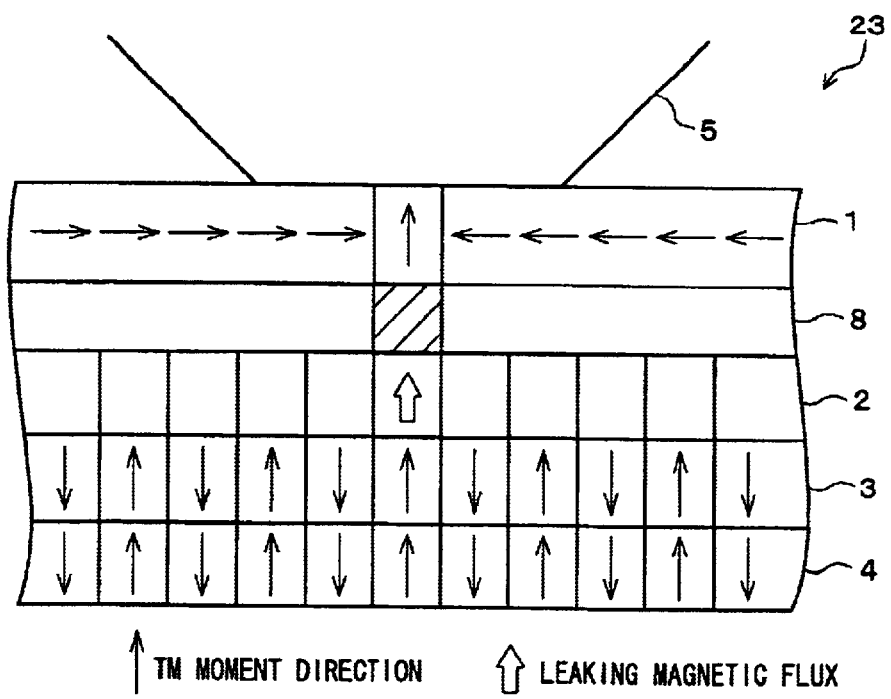
FIG. 10 is a cross-sectional view showing magnetization to illustrate reproduction principles of a super-resolution magneto-optical storage medium of embodiment 3 in accordance with the present invention.

FIG. 10 is an explanatory drawing showing, in a cross-sectional view, the magnetization of a super-resolution magneto-optical storage medium 23 of the present invention.

The super-resolution magneto-optical storage medium 23 is identical to the super-resolution magneto-optical storage medium 20 of FIG. 1, except that an in-plane magnetized layer 8 (fifth magnetic layer) is stacked with a Curie temperature being set around a critical temperature, where the reproduction layer 1 changes to perpendicular magnetization. Members that have the same function as those in the super-resolution magneto-optical storage medium 20 are indicated by the same reference numerals and no explanation is given to those members.

In the super-resolution magneto-optical storage medium 23, the reproduction layer 1 and the in-plane magnetized layer 8 are exchange coupled to each other at not more than a Curie temperature of the in-plane magnetized layer 8, so that an in-plane magnetized mask on the reproduction layer 1 is strengthened. Therefore, like the super-resolution magneto-optical storage medium 20, it is possible to obtain a large reproduction power margin and preferable recording characteristics and to realize a higher reproduction resolution.

Regarding the super-resolution magneto-optical storage medium 23, the construction has been described in which the reproduction layer 1 and the in-plane magnetized layer 8 are stacked in this order from an emitting side of a light beam 5. It is also possible to adopt a construction in which the in-plane magnetized layer 8 and the reproduction layer 1 are stacked in this order from the emitting side of the light beam 5. However, a reproduction signal is reproduced when the reproduction layer 1 exhibits perpendicular magnetization. In the construction in which the in-plane magnetized layer 8 and the reproduction layer 1 are stacked in this order from the emitting side of the light beam 5, the light beam 5 passes through the in-plane magnetized layer 8 and reproduced light from the reproduction layer 1 is detected, so that a reproduction signal component contained in reflected light is reduced, relatively degrading quality of the reproduction signal. In other words, it is desirable to adopt the construction in which the reproduction layer 1 and the in-plane magnetized layer 8 are stacked in this order from the emitting side of the light beam 5.

[Embodiment 4]

Figure 11:
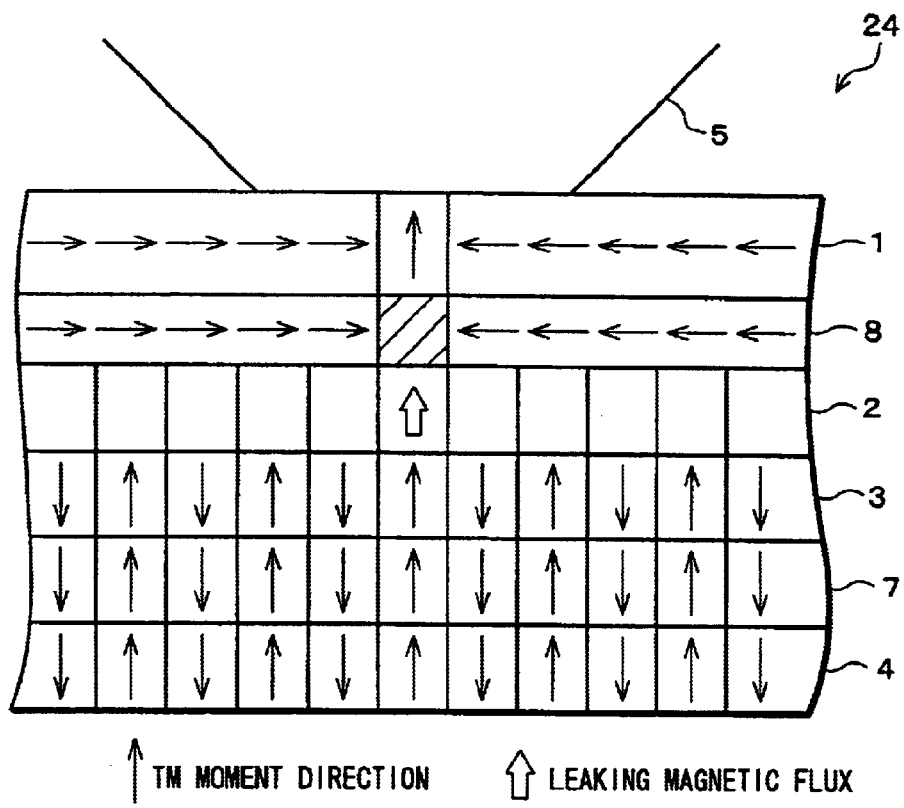
FIG. 11 is a cross-sectional view showing magnetization to illustrate reproduction principles of a super-resolution magneto-optical storage medium of embodiment 4 in accordance with the present invention.

FIG. 11 is a cross-sectional view of a super-resolution magneto-optical storage medium 24 of another embodiment in accordance with the present invention, showing its magnetization. The super-resolution magneto-optical storage medium 24 is identical to the super-resolution magneto-optical storage medium 20 of FIG. 1, except that the former additionally includes a supplementary storage layer 7 and an in-plane magnetized layer 8 which has a Curie temperature around the critical temperature at which the reproduction layer 1 changes to perpendicular magnetization. Members that have the same function as those in the super-resolution magneto-optical storage medium 20 are indicated by the same reference numerals and no explanation is given to those members.

In the super-resolution magneto-optical storage medium 24, the reproduction layer 1 is exchange coupled to the in-plane magnetized layer 8 at temperatures not higher than the Curie temperature of the in-plane magnetized layer 8, which reinforces the in-plane magnetized mask on the reproduction layer 1. The super-resolution magneto-optical storage medium 24 thus can achieve higher reproduction resolution, as well as a wide reproduction power margin, satisfactory recording characteristics, and recording at low magnetic field strengths, similarly to the super-resolution magneto-optical storage medium 22 shown in FIG. 8.

In the description so far as to the super-resolution magneto-optical storage medium 24, we have assumed that the reproduction layer 1 and the in-plane magnetized layer 8 are located in this order when viewed from the side of the medium 24 at which the light beam 5 enters the medium 24. Alternatively, the reproduction layer 1 and the in-plane magnetized layer 8 may be located in reverse order. However, the reproduction signal is available only where the reproduction layer 1 exhibits perpendicular magnetization. If the reproduction layer 1 and the in-plane magnetized layer 8 are disposed so that the light beam 5 enters the in-plane magnetized layer 8 first, the light beam 5 must pass through the in-plane magnetized layer 8 both before and after the reflection from reproduction layer 1. This reduces the reproduction signal component carried by the reflected beam, thereby degrading the reproduction signal quality. For these reasons, the reproduction layer 1 and the in-plane magnetized layer 8 are preferably located in this order when viewed from the side of the medium 24 at which the light beam 5 enters the medium 24.

Specific examples will now be presented in detail in accordance with the present invention.

EXAMPLE 1

The description which appears immediately below will discuss a super-resolution magneto-optical disk 5, shown in FIG. 12, which is an application of the super-resolution magneto-optical storage medium 20 of embodiment 1 in accordance with the present invention.

Figure 12:
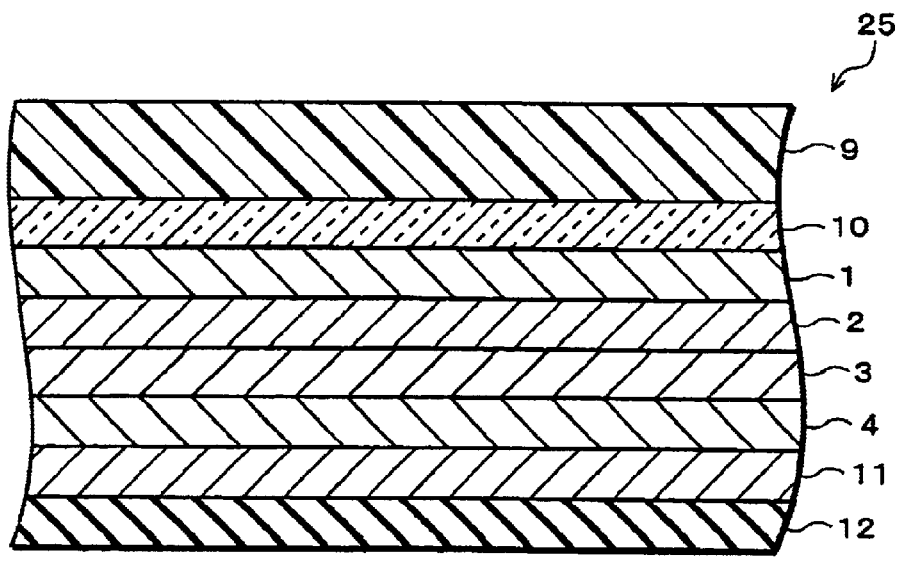
FIG. 12 is a cross-sectional showing a structure of a super-resolution magneto-optical disk of example 1.

FIG. 12 is a cross-sectional view showing the structure of the super-resolution magneto-optical disk 25. The super-resolution magneto-optical disk 25 includes a main disk body constituted by a substrate 9, a transparent dielectric layer 10, a reproduction layer 1, a non-magnetic intermediate layer 2, a magnetic flux forming layer 3, a storage layer 4, a protection layer 11, and an overcoating layer 12, which substrate and layers are stacked in this order.

Data is recorded on the super-resolution magneto-optical disk 25 via a Curie temperature recording method, whereby a magnetic field is applied to the storage layer 4 that is heated to a temperature around its Curie temperature. Accordingly, information is reproduced using magneto-optical effects known as a polar Kerr effect: a light beam 5 is projected from a semiconductor laser and focused by an objective lens on the reproduction layer 1, so as to perform recording and reproduction. A polar Kerr effect refers to a phenomenon in which the rotation of a plane of polarization of reflected light is reversed by the direction of magnetization that is perpendicular to the light-entering surface.

The substrate 9 is composed primarily of polycarbonate or other transparent material formed in a disk shape, for example.

The transparent dielectric layer 10 is preferably composed of a material containing no oxygen, such as AlN, SiN, or AlSiN. Requirements on the thickness of the transparent dielectric layer 10 include such that it imparts satisfactory interference to the incident laser and increases the Kerr rotation angle of the medium. Accordingly, the thickness of the transparent dielectric layer 10 is set to about ($\lambda/4N$), where $\lambda$ is the wavelength of the reproduction light and N is the index of refraction of the transparent dielectric layer 10. Taking a laser having a wavelength of 680 nm as an example, the thickness of the transparent dielectric layer 10 should be set in a range of from 40 nm to 100 nm.

The reproduction layer 1 is a magnetic film constituted by an amorphous thin film of an alloy rare-earth and transition metals. The composition of the reproduction layer 1 is adjusted to impart it such magnetic properties that it exhibits in-plane magnetization at room temperature and changes to perpendicular magnetization at a temperature equal to, or higher than, a critical temperature. The reproduction layer 1 is, for example, made of GdFeCo, GdDyFeCo, or GdTbFeCo.

The critical temperature of the reproduction layer 1 is preferably in a range of from 100° C. to 200° C. If the critical temperature is lower than 100° C., the reproduction layer 1 changes to perpendicular magnetization with a slight rise in temperature; reproduction characteristics become unstable since they are easily affected by changes in ambient temperature. If the critical temperature is higher than 200° C., the critical temperature is too close to the Curie temperature of the storage layer 3, which making it difficult to ensure a suitable reproduction power margin.

The thickness of the reproduction layer 1 is preferably in a range of from 10 nm to 80 nm. If the thickness of the reproduction layer 1 is smaller than 10 nm, the reproduction layer 1 reflects a decreased amount of reflected light, which markedly reduces the amplitude of the reproduction signal. The reduced thickness also allows the light beam 5 to pass through the reproduction layer 1 and eventually the magnetic information in the magnetic flux forming layer 3 to be reproduced, which degrades the reproduction resolution. On the other hand, if the thickness is greater than 80 nm, the combined thickness increases, which markedly degrades the sensitivity in recording.

The non-magnetic intermediate layer 2 is composed of a dielectric, such as AlN, SiN, or AlSiN; a non-magnetic metal, such as Al, Ti, or Ta; or an alloy of those metals. The thickness of the non-magnetic intermediate layer 2 is set in a range of from 0.5 nm to 60 nm to establish stable magnetostatic coupling between the reproduction layer 1 and the magnetic flux forming layer 3. It is difficult to fabricate the non-magnetic intermediate layer 2 with a uniform thickness smaller than 0.5 nm. In that case, the magnetostatic coupling becomes unstable. On the other hand, if the non-magnetic intermediate layer 2 is thicker than 60 nm, the magnetic flux forming layer 3 is separated from the reproduction layer 1 by the increased distance, rendering it impossible to maintain stable magnetostatic coupling between those layers. The magnetic flux forming layer 3 is preferably separated from the reproduction layer 1 by a distance equal to, or smaller than, 60 nm.

The magnetic flux forming layer 3 is preferably constituted by a perpendicularly magnetized film composed of an alloy of rare-earth and transition metals with a compensation temperature around room temperature, and has a smaller perpendicular magnetic anisotropy than the storage layer 4.

To carry out recording via magnetic field modulation, it is preferred if the magnetic flux forming layer 3 exhibits a coercive force of 24 kA/m (300 Oe) or weaker at the Curie temperature of the storage layer 4.

The thickness of the magnetic flux forming layer 3 is set in a range of from 20 nm to 80 nm. If the magnetic flux forming layer 3 is thinner than 20 nm, the leaking magnetic flux arising from the magnetic flux forming layer 3 grows smaller, rendering it impossible to maintain stable magnetostatic coupling. On the other hand, if the magnetic flux forming layer 3 is thicker than 80 nm, the combined thickness increases, which markedly degrades the sensitivity in recording.

The compensation temperature of the magnetic flux forming layer 3 is preferably in a range of from −50° C. to 100° C. If the compensation temperature is below −50° C., a large leaking magnetic flux arises from the magnetic flux forming layer 3 around room temperature, which reduces the reproduction resolution. On the other hand, if the compensation temperature exceeds 100° C., the magnetic flux forming layer 3 fails to produce sufficiently large magnetization at temperatures at which the reproduction layer 1 exhibits perpendicular magnetization, which renders it impossible to maintain stable magnetostatic coupling.

To produce a sufficiently large leaking magnetic flux around the critical temperature at which the reproduction layer 1 changes into perpendicular magnetization, the magnetic flux forming layer 3 is required to produce a net magnetization with a peak value greater than that of the net magnetization produced by the storage layer 4. To fulfill this requirement, the Curie temperature of the magnetic flux forming layer 3 needs to be at least higher than that of the storage layer 4.

In addition, to ensure stable production of a leaking magnetic flux at high temperatures and thus establish more stable magnetostatic coupling to the reproduction layer 1, the magnetic flux forming layer 3 preferably produces a net magnetization with a peak value at a temperature higher than the critical temperature of the reproduction layer 1. The Curie temperature of the magnetic flux forming layer 3 is preferably 300° C. or higher.

The magnetic flux forming layer 3 is composed of DyFeCo, HoFeCo, DyHoFeCo, GdDyFeCo, or GdHoFeCo, for example.

The storage layer 4 is constituted by a perpendicularly magnetized film of an alloy of rare-earth and transition metals. To exhibit greater perpendicular magnetic anisotropy than the magnetic flux forming layer 3 and achieve sufficient sensitivity in actual recording, the storage layer 4 preferably has a Curie temperature specified in a range of from 220° C. to 280° C.

To keep in stable conditions the magnetic domain in which information is recorded via a magnetic field modulation, it is preferred if the coercive force of the storage layer 4 rapidly increases as temperature drops starting at the Curie temperature of the storage layer 4. To achieve this, the compensation temperature of the storage layer 4 is preferably in a range of from 50° C. to 200° C. The storage layer 4 is preferably composed of a material with relatively great perpendicular magnetic anisotropy, such as TbFeCo or TbDyFeCo. More preferably, the storage layer 4 exhibits greater perpendicular magnetic anisotropy than does the magnetic flux forming layer 3.

The thickness of the storage layer 4 is preferably set in a range. of from 10 nm to 40 nm. If the storage layer 4 is thinner than 10 nm, the storage layer 4 becomes too thin in comparison with the magnetic flux forming layer 3. The excessively reduced thickness thus causes the storage layer 4 to be exchange coupled to the magnetic flux forming layer 3. The storage layer 4 therefore is subjected to the disturbance by the magnetic properties of the magnetic flux forming layer 3 to a relatively great extent. When temperature falls starting at the Curie temperature, the coercive force of the storage layer 4 gradually increases and thereby degrades recording characteristics of the storage layer 4. On the other hand, if the storage layer 4 is thicker than 40 nm, the combined thickness increases, which markedly degrades the sensitivity in recording.

The protection layer 11 is composed of a dielectric, such as AlN, SiN, or AlSiN; or an alloy of non-magnetic metals, such as Al, Ti, and Ta. The protection layer 11 is provided for the purpose of preventing oxidation of those alloys of rare-earth and transition metals included in the reproduction layer 1 and the magnetic flux magnetic layer 3. The thickness of the protection layer 11 is set in a range of from 5 nm to 60 nm.

The overcoating layer 12 is formed by depositing a UV-ray curing resin or a thermal curing resin using spin coat technique and then curing the resin by means of illumination with ultraviolet rays or heating.

Now, a method will be explained to fabricate the magneto-optical disk 25 including the foregoing structure. We will also present specific examples of recording and reproduction characteristics of the magneto-optical disk 25.

(1) A Method to Fabricate the Magneto-optical Disk 25

First, a polycarbonate substrate 9 was placed on a substrate holder in a sputtering device equipped with an Al target, a GdFeCo alloy target, a DyFeCo alloy target, and a TbFeCo alloy target. The disk-shaped polycarbonate substrate 9 had 0.6-$\mu$m-wide, spiral land and groove recording regions, in both of which regions information was recordable. The sputtering device was then evacuated to $1.3 \times 10^{-4}$ Pa ($1 \times 10^{-6}$ Torr), before introducing a mixed gas of argon and nitrogen. Subsequently, electrical power was supplied to the Al target to form a 6-nm-thick, transparent, AlN dielectric layer 10 on the substrate 9 under a condition that the gas pressure was adjusted to 0.53 Pa ($4 \times 10^{-3}$ Torr).

Next, the sputtering device was again evacuated to $1.3 \times 10^{-4}$ Pa ($1 \times 10^{-6}$ Torr) before introducing argon gas. Electrical power was then supplied to the GdFeCo alloy target to form a 40-nm-thick, $Gd_{0.30}(Fe_{0.80}Co_{0.20})_{0.70}$ reproduction layer 1 on the transparent dielectric layer 10 under a condition that the gas pressure was adjusted to 0.53 Pa ($4 \times 10^{-3}$ Torr). The resultant reproduction layer 1 exhibited in-plane magnetization at room temperature and changed into perpendicular magnetization at 110° C. The reproduction layer 1 had a Curie temperature at 300° C., but no compensation temperature. The reproduction layer 1 was RE-rich from room temperature to Curie temperature.

Following introduction of a mixed gas of argon and nitrogen, electrical power was supplied to the Al target to form a 5-nm-thick, AlN non-magnetic intermediate layer 2 on the reproduction layer 1 under a condition that the gas pressure was adjusted to 0.53 Pa ($4 \times 10^{-3}$ Torr).

The sputtering device was again evacuated to $1.3 \times 10^{-4}$ Pa ($1 \times 10^{-6}$ Torr) before introducing argon gas. Electrical power was then supplied to the DyFeCo alloy target to form a 50-nm-thick, $Dy_{0.23}(Fe_{0.55}Co_{0.45})_{0.77}$ magnetic flux forming layer 3 on the non-magnetic intermediate layer 2 under a condition that the gas pressure was adjusted to 0.53 Pa ($4 \times 10^{-3}$ Torr). The resultant magnetic flux forming layer 3 had a compensation temperature of 25° C. and a Curie temperature of 375° C.

Electrical power was supplied to the TbFeCo alloy target to form a 15-nm-thick, $Tb_{0.26}(Fe_{0.82}Co_{0.18})_{0.74}$ storage layer 4 on the magnetic flux forming layer 3 under a condition that the gas pressure was adjusted to 0.53 Pa ($4 \times 10^{-3}$ Torr). The resultant storage layer 4 had compensation temperature of 100° C. and a Curie temperature of 250° C.

Following introduction of a mixed gas of argon and nitrogen, electrical power was supplied to the Al target to form a 20-nm-thick, AlN protection layer 11 on the storage layer 4 under a condition that the gas pressure was adjusted to 0.53 Pa ($4 \times 10^{-3}$ Torr).

Finally, a UV-ray curing resin was deposited on the protection layer 11 using a spin coating technique and illuminated with UV radiation, to form an overcoating layer 12.

(2) Recording and Reproduction Characteristics

Similarly to the magneto-optical disk 25 of example 1, a super-resolution magneto-optical disk (not shown) was fabricated as comparative example 1 incorporating the conventional super-resolution magneto-optical storage medium 21 shown in FIG. 2. The super-resolution magneto-optical disk as comparative example 1 did no include a magnetic flux forming layer 3 or a storage layer 4, but included a 65-nm-thick $Tb_{0.24}(Fe_{0.85}Co_{0.15})_{0.76}$ storage layer 6. The storage layer 6 of comparative example 1 had a compensation temperature of 25° C. and a Curie temperature of 250° C.

Figure 13:
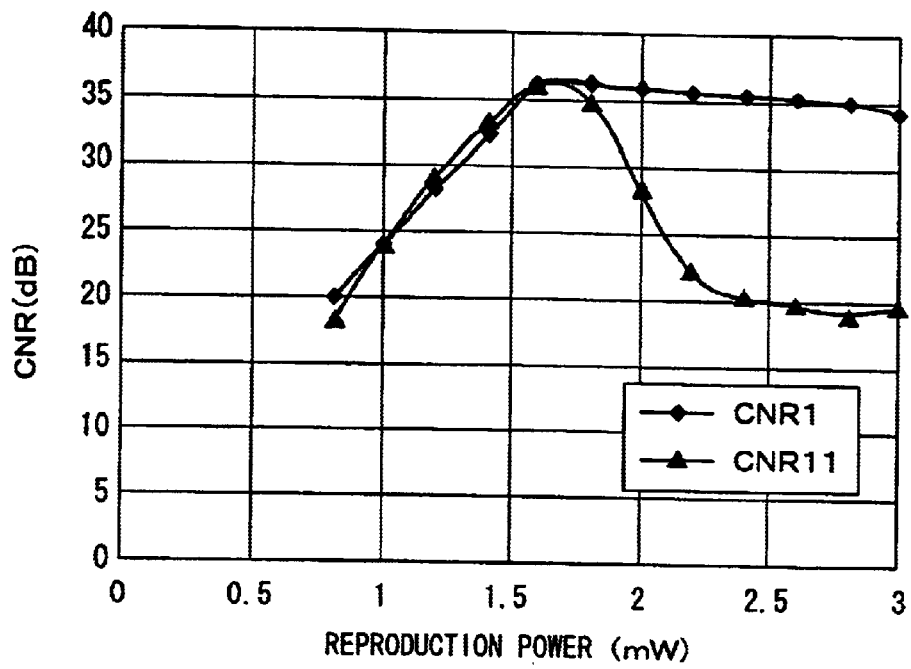
FIG. 13 is a graphical representation showing the reproduction power dependence of the CNR of a super-resolution magneto-optical disk of example 1.

A magnetic recording domain of a mark length of 0.3 $\mu$m was repeatedly formed along the lengths of the land recording regions of the super-resolution magneto-optical disk 25 of example 1 and the super-resolution magneto-optical disk of comparative example 1 at a linear velocity 5 m/s using an evaluation device that has an optical pickup capable of projecting a semiconductor laser with a wavelength of 630 nm according to a magnetic-field-modulation recording technique. FIG. 13 shows reproduction power dependence of the CNRs (signal-to-noise ratio) obtained in reproduction from the magnetic recording domains. In the figure, CNR 1 represents results of example 1, whereas CNR11 represents results of comparative example 1.

Here, the mark length was equal to the length (0.3 $\mu$m) of the magnetic recording domain and also equal to half the pitch (0.6 $\mu$m) between two adjacent magnetic recording domains.

For both CNR 1 (example 1) and CNR 11 (comparative example 1), when the reproduction power increased, the reproduction layer 1 changed from in-plane magnetization to perpendicular magnetization, and the CNR grew accordingly. This was a result of the realization of super-resolution reproduction. CNR 1 and CNR 11 both peaked at 36 dB with a reproduction power of 1.6 mW. As the reproduction power increased further, CNR 11 plummeted, whereas CNR 1 remained substantially constant. This showed that a wider reproduction power margin was available in example 1.

For comparative example 1, as the reproduction power increased, since temperature at the center of the light beam spot increased closer to the Curie temperature of the storage layer 6, the net magnetization of the storage layer 6 grew smaller at the center of the light beam spot. The leaking magnetic flux arising from the storage layer 6 also grew smaller accordingly, which weakened the magnetostatic coupling between the reproduction layer 1 and the storage layer 6 to the extent that stable reproduction was disrupted.

In contrast, in example 1, since the net magnetization of the magnetic flux forming layer 3 continued to grow larger up to around the Curie temperature of the storage layer 4, the magnetic flux forming layer 3 exhibited the greatest net magnetization at the center of the light beam spot at all times. Further, since the leaking magnetic flux arising from the magnetic flux forming layer 3 grew gradually with a rise in reproduction power, a wider reproduction power margin was available.

This description would sufficiently explain that the super-resolution magneto-optical disk 25 incorporating the super-resolution magneto-optical storage medium 20 of embodiment 1 successfully performed stable reproduction even at high reproduction powers and offered wide power margin in comparison with the super-resolution magneto-optical disk of comparative example 1. A magneto-optical storage medium would show satisfactory performance by incorporating the structure of the super-resolution magneto-optical storage medium 20 of embodiment 1.

EXAMPLE 2

The following description will explain example 2 in accordance with the present invention in reference to associated figures. In example 2, the super-resolution magneto-optical storage medium 22 of embodiment 2 above will be applied to a magneto-optical disk. Explanation is omitted of members that have the same function as those in example 1.

Figure 14:
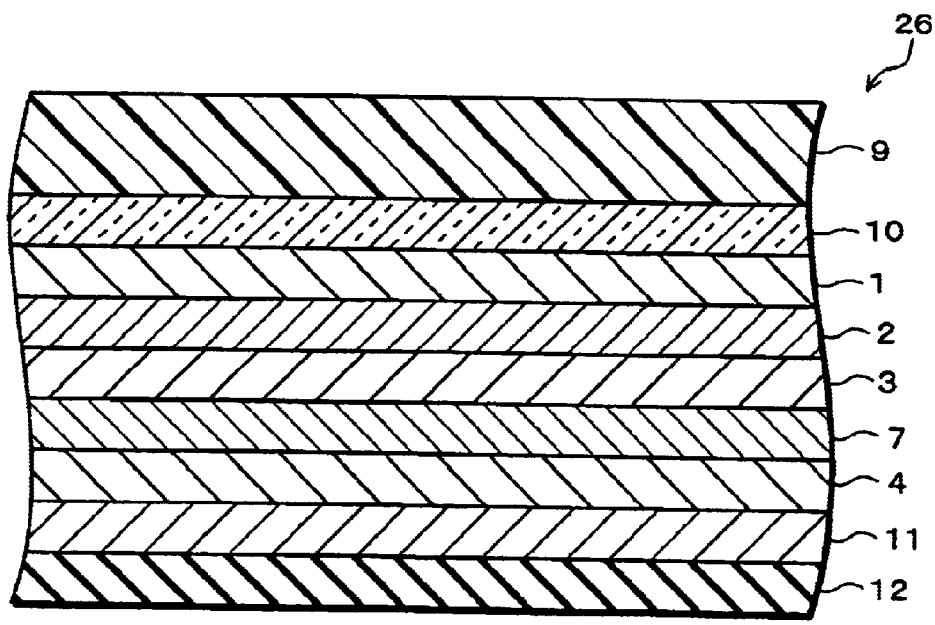
FIG. 14 is a cross-sectional showing a structure of a super-resolution magneto-optical disk of example 2.

The super-resolution magneto-optical disk 26 of example 2 shown in FIG. 14 is identical to the super-resolution magneto-optical disk 25 of example 1, except that the former includes a 10-nm-thick, $Gd_{0.26}(Fe_{0.78}Co_{0.22})_{0.74}$, supplementary storage layer 7 being interposed between the magnetic flux forming layer 3 and the storage layer 4.

FIG. 14 is a cross-sectional view showing the structure of the super-resolution magneto-optical disk 26. The super-resolution magneto-optical disk 26 is constituted by a substrate 9, a transparent dielectric layer 10, a reproduction layer 1, a non-magnetic intermediate layer 2, a magnetic flux forming layer 3, a supplementary storage layer 7, a storage layer 4, a protection layer 11, and an overcoating layer 12, which substrate and layers are stacked in this order.

The supplementary storage layer 7 has a Curie temperature of 320° C., and exhibited a coercive force of 2.4 kA/m (30 Oe) at the Curie temperature of the storage layer 4 (i.e., 250° C.).

Experiments were conducted on the reproduction power dependence of the CNR of the super-resolution magneto-optical disk 26 under the same conditions as in example 1. The mark length of 0.3 μm was not changed. The experiments revealed similar results to CNR 1 of example 1 shown in FIG. 13. We could thus confirm that a wide reproduction power margin was available with the super-resolution magneto-optical disk 26 in example 2 just as with the super-resolution magneto-optical disk 25 of example 1.

Figure 15:
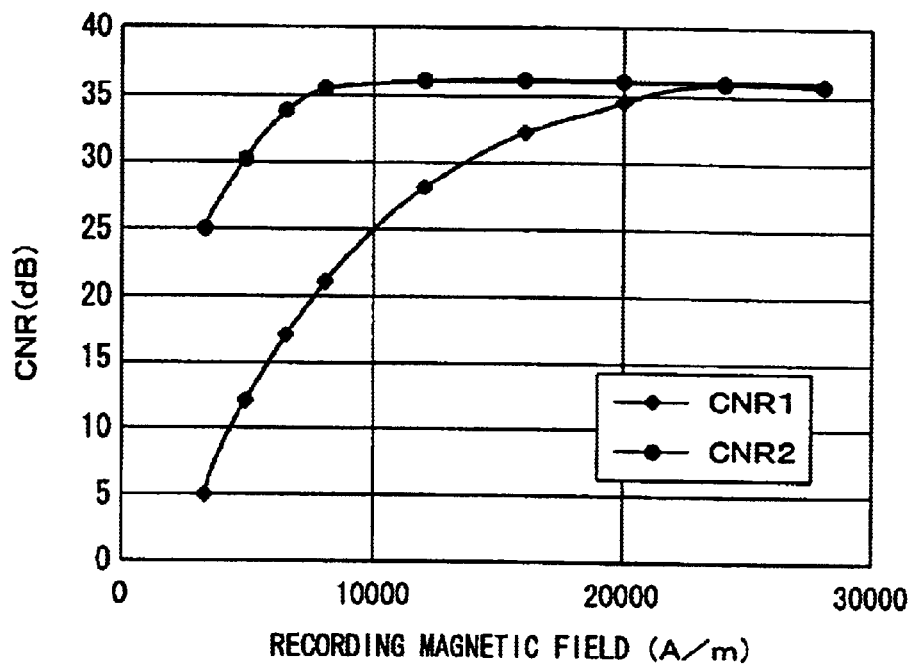
FIG. 15 is a graphical representation of the recording magnetic field dependence of the CNR of the super-resolution magneto-optical disk of example 2.

FIG. 15 shows recording magnetic field dependence (CNR 2) of the CNR of the super-resolution magneto-optical disk 26 of example 2 with a mark length of 0.3 μm, a reproduction power of 1.8 mW, and a recording power of 5.5 mW. FIG. 15 also shows recording magnetic field dependence (CNR 1) of the CNR of the super-resolution magneto-optical disk 25 of example 1. In FIG. 15, the recording magnetic field of 8000 A/m (100 Oe) means that recording was carried out in the presence of an alternating magnetic field applied by a magnetic head so that the intensity is modulated in the range of ±8000 A/m (±100 Oe), while continuously projecting a laser beam of a recording power of 5.5 mW.

CNR 1 of the super-resolution magneto-optical disk 25 of example 1, which included no supplementary storage layer 7, reached a saturation point when the recording magnetic field was 24000 A/m (300 Oe). In contrast, CNR 2 of the super-resolution magneto-optical disk 26 of example 2, which included a supplementary storage layer 7, reached a saturation point when the recording magnetic field 8000 A/m (100 Oe). The comparison shows that the provision of the supplementary storage layer 7 enables recording with low magnetic field strengths.

From the results above, in the super-resolution magneto-optical disk 25 of example 1, the coercive force produced by the magnetic flux forming layer 3 is 16 kA/m (200 Oe) at the Curie temperature of the storage layer 4, and a recording magnetic field of 24000 A/m (300 Oe) is required to perform satisfactory recording. In contrast, in the super-resolution magneto-optical disk 26 of example 2, the supplementary storage layer 7, which produces a coercive force as small as about 2.4 kA/m (30 Oe) at the Curie temperature of the storage layer 4, is exchange coupled to the magnetic flux forming layer 3 and the storage layer 4. This can viewed as satisfactory recording being successfully done at a recording magnetic field of about 8000 A/m (100 Oe) due to the fact that the magnetization of the supplementary storage layer 7 and the magnetic flux forming layer 3 is readily reversed by a low magnetic field strength.

It would be understood from the above description that the structure employed in the super-resolution magneto-optical disk 26 could improve recording characteristics at low magnetic field strengths better than that employed in the super-resolution magneto-optical disk 25 of comparative example 1.

EXAMPLE 3

The following description will discuss example 3 in accordance with the present invention in reference to associated figures. In example 3, the super-resolution magneto-optical storage medium 23 will be applied to a magneto-optical disk. Explanation is omitted of members that have the same function as those in example 1 or 2.

Figure 16:
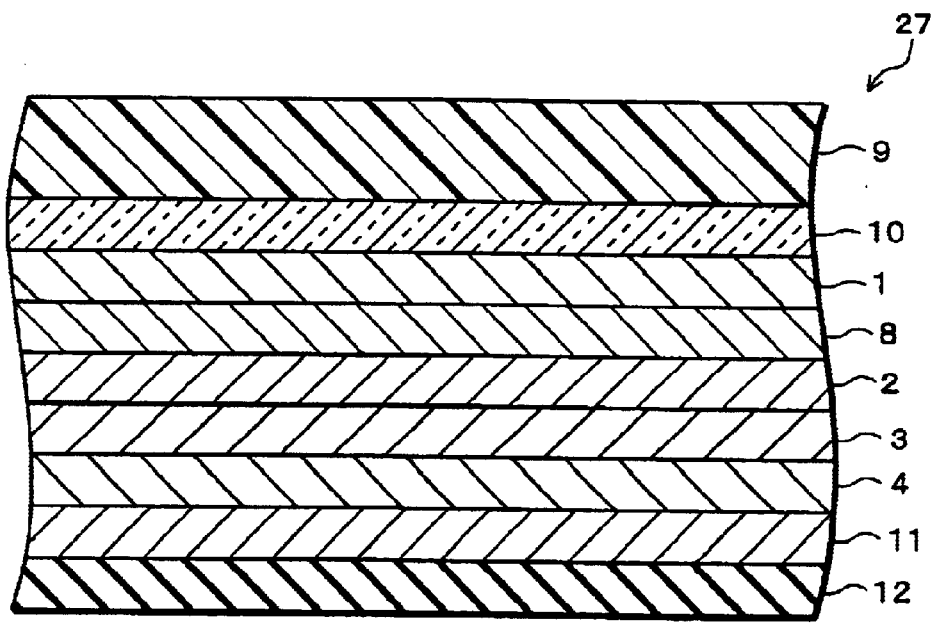
FIG. 16 is a cross-sectional showing the structure of a super-resolution magneto-optical disk of example 3.

The super-resolution magneto-optical disk 27 shown in FIG. 16 is identical to the super-resolution magneto-optical disk 25 of example 1, except that the former includes a 20-nm-thick, $Gd_{0.13}Fe_{0.87}$ in-plane magnetized layer 8 being interposed between the reproduction layer 1 and the non-magnetic intermediate layer 2.

FIG. 16 is a cross-sectional view showing the structure of the super-resolution magneto-optical disk 27. The super-resolution magneto-optical disk 27 includes a disk main body constituted by a substrate 9, a transparent dielectric layer 10, a reproduction layer 1, an in-plane magnetized layer 8, a non-magnetic intermediate layer 2, a magnetic flux forming layer 3, a storage layer 4, a protection layer 11, and an overcoating layer 12, which substrate and layers are stacked in this order.

The in-plane magnetized layer 8 has a Curie temperature of 140° C., and exhibits in-plane magnetization throughout a temperature range up to the Curie temperature.

Similarly, a conventional super-resolution magneto-optical disk (not shown) was fabricated as comparative example 3, which unlike example 3 did not include a magnetic flux forming layer 3 or a storage layer 4, but included a 65-nm-thick $Tb_{0.24}(Fe_{0.85}Co_{0.15})_{0.76}$ storage layer 6. The storage layer 6 of comparative example 3 had a compensation temperature of 25° C. and a Curie temperature of 250° C.

Figure 17:
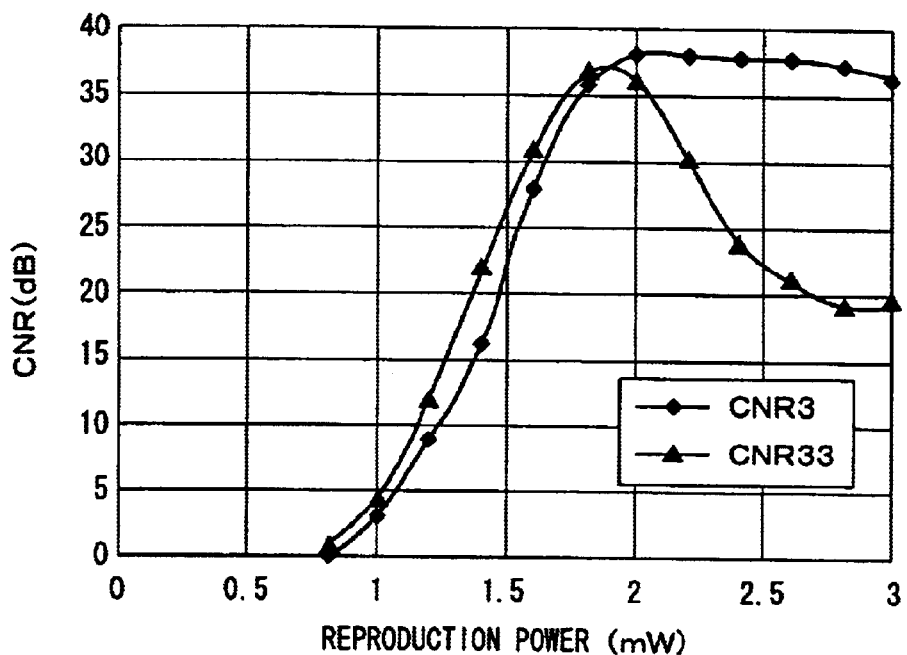
FIG. 17 is a graphical representation showing the reproduction power dependence of the CNR of the super-resolution magneto-optical disk of example 3.

FIG. 17 shows results of experiments conducted in the same manner as in example 1 on the reproduction power dependence of the CNR of the super-resolution magneto-optical disk 27 and the super-resolution magneto-optical disk of comparative example 3, by reproducing the data stored in the magnetic recording domains having a mark length of 0.3 μm. In FIG. 17, CNR 3 represents results of example 3, whereas CNR 33 represents results of comparative example 3.

The exchange coupling of the reproduction layer 1 and the in-plane magnetized layer 8 having a low Curie temperature reinforced the in-plane magnetized mask on the reproduction layer 1. In comparison with CNR 1 and CNR 11 of example 1, CNR 3 and CNR 33 of example 3 were low when the reproduction power is low and great when the reproduction power was optimal. Overall, CNR 3 and CNR 33 showed improved reproduction resolution.

Comparison of CNR 3 and CNR 33 revealed that CNR 3 had a wider reproduction power margin than CNR 33 as is the case with example 1.

It would be understood from the above description that the structure employed in the super-resolution magneto-optical disk 27 could achieve a wider reproduction power margin which is as wide as that of the super-resolution magneto-optical disk 25 of example 1 and improve reproduction resolution.

EXAMPLE 4

The following description will discuss example 4 in accordance with the present invention in reference to associated figures. In example 4, the super-resolution magneto-optical storage medium 24 will be applied to a magneto-optical disk. Explanation is omitted of members that have the same function as those in example 1 through 3.

Figure 18:
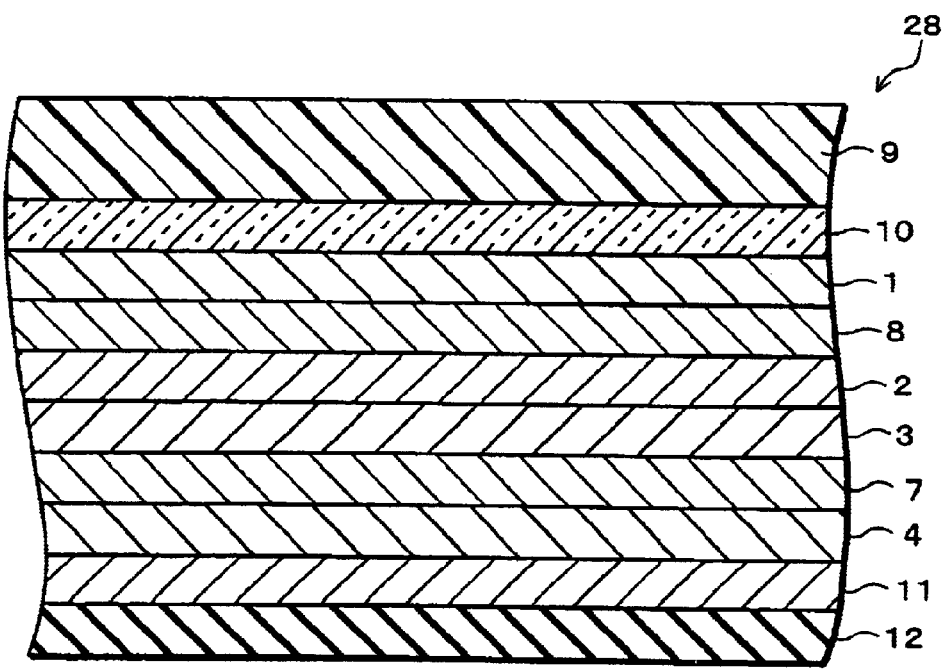
FIG. 18 is a cross-sectional showing the structure of a super-resolution magneto-optical disk of example 4.

The super-resolution magneto-optical disk 28 shown in FIG. 18 is identical to the super-resolution magneto-optical disk 27 of example 3, except that the former includes a 10-nm-thick, $Gd_{0.26}(Fe_{0.78}Co_{0.22})_{0.74}$ supplementary storage layer 7 being interposed between the magnetic flux forming layer 3 and the storage layer 4.

FIG. 18 is a cross-sectional showing the structure of the super-resolution magneto-optical disk 28. The super-resolution magneto-optical disk 28 is constituted by a substrate 9, a transparent dielectric layer 10, a reproduction layer 1, an in-plane magnetized layer 8, a non-magnetic intermediate layer 2, a magnetic flux forming layer 3, a supplementary storage layer 7, a storage layer 4, a protection layer 11, an overcoating layer 12, which substrate and layers are stacked in this order.

The supplementary storage layer 7 has a Curie temperature of 320° C., and has a coercive force of 2.4 kA/m (30 Oe) at the Curie temperature of the storage layer 4, i.e., 250° C.

Experiments were conducted on the reproduction power dependence of the CNR of the super-resolution magneto-optical disk 28 under the same conditions as in example 3. The mark length of 0.3 μm was not changed. The experiments revealed similar results to CNR 3 of example 3 shown in FIG. 17. We could thus confirm that a wide reproduction power margin was available with example 4 just as with example 3.

Figure 19:
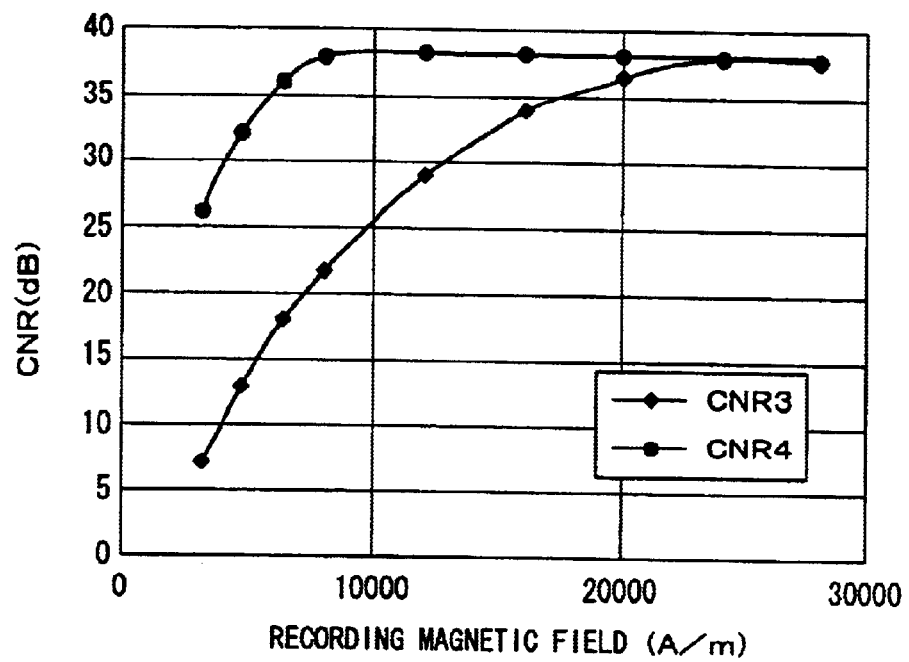
FIG. 19 is a graphical representation showing the recording magnetic field dependence of the CNR of the super-resolution magneto-optical disk of example 4 in accordance with the present invention.

FIG. 19 shows recording magnetic field dependence (CNR 4) of the CNR of the super-resolution magneto-optical disk 28 with a mark length of 0.3 μm, a reproduction power of 2.0 mW, and a recording power of 5.8 mW. FIG. 19 also shows recording magnetic field dependence (CNR 3) of the CNR of the super-resolution magneto-optical disk 27 of example 3. In FIG. 19, the recording magnetic field of 8000 A/m (100 Oe) means that recording was carried out in the presence of an alternating magnetic field applied by a magnetic head so that the intensity is modulated in the range of ±8000 A/m (±100 Oe), while continuously projecting a laser beam of a recording power of 5.5 mW.

CNR 3 of the super-resolution magneto-optical disk 27 of example 3, which included no supplementary storage layer 7, reached a saturation point when the recording magnetic field was 24000 A/m (300 Oe). In contrast, CNR 4 of the super-resolution magneto-optical disk 28 of example 4, which included a supplementary storage layer 7, reached a saturation point when the recording magnetic field 8000 A/m (100 Oe). The comparison shows that the provision of the supplementary storage layer 7 enables recording with low magnetic field strengths.

From the results above, in example 3, the coercive force produced by the magnetic flux forming layer 3 is 16 kA/m (200 Oe) at the Curie temperature of the storage layer 4, and a recording magnetic field of 2.4 kA/m (30 Oe) is required to perform satisfactory recording. In contrast, in example 4, the supplementary storage layer 7, which produces a coercive force as small as about 2400 A/m (30 Oe) at the Curie temperature of the storage layer 4, is exchange coupled to the magnetic flux forming layer 3 and the storage layer 4. This permits the magnetization of the supplementary storage layer 7 and the magnetic flux forming layer 3 to be readily reversed by a low magnetic field strength, and eventually leads to satisfactory recording being successfully done at a recording magnetic field of about 8000 A/m (100 Oe).

It would be understood from the above description that the structure employed in the super-resolution magneto-optical disk 28 could improve reproduction resolution and recording characteristics at low magnetic field strengths better than that employed in the super-resolution magneto-optical disk 25.

In examples 1 through 4, we described strictures including a non-magnetic intermediate layer 2 for the purpose of establishing stable magnetostatic coupling between the reproduction layer 1 and the in-plane magnetized layer 8 as well as among the magnetic flux forming layer 3, the supplementary storage layer 7, and the storage layer 4. However, any means other than the non-magnetic intermediate layer 2 may be alternatively used as long as the magnetostatic coupling is established.

For example, stable magnetostatic coupling can be achieved, for example, by the use of either a rare-earth metal with an extremely low Curie temperature, such as Gd, Tb, Dy, or Nd; or a transition metal with in-plane magnetic anisotropy which is sufficiently large enough to cut off the exchange coupling, such as Fe or Co. Recording and reproduction characteristics similar to examples 1 through 4 are available in these cases too.

EXAMPLE 5

In example 5, experiments were conducted on the recording and reproduction characteristics of a super-resolution magneto-optical disk 27 that has the same structure as described in example 3. The differences lie in the components making up the magnetic flux forming layer 3. Explanation is omitted of members of example 5 that have the same function as those in the foregoing examples.

In the super-resolution magneto-optical disk 27 of example 3, the reproduction layer 1, the in-plane magnetized layer 8, the magnetic flux forming layer 3, and the storage layer 4 were composed respectively of GdFeCo, GdFe, DyFeCo, and TbFeCo. In this case, a recording magnetic field as high as 24000 A/m (300 Oe) was required as indicated by CNR 3 in FIG. 19, because the DyFeCo magnetic flux forming layer 3 produces a coercive force of about 16000 A/m (200 Oe) at the Curie temperature of the TbFeCo storage layer 4. If in the structure shown in example 3 the magnetic flux forming layer 3 is composed of a material such that it can produce a weaker coercive force at the Curie temperature of the TbFeCo storage layer 4, recording would be successfully done at lower magnetic fields. To this end, the magnetic flux forming layer 3 is preferably composed of an alloy of rare-earth and transition metals, such as HoFeCo, HoDyFeCo, HoTbFeCo, GdDyFeCo, or GdTbFeCo, that has a smaller perpendicular magnetic anisotropy than DyFeCo.

Table 1 shows magnetic properties of various magnetic flux forming layers 3 composed of different materials for comparative purposes. Tc3 denotes the Curie temperature of the magnetic flux forming layers 3, Hc3 denotes the coercive force of the magnetic flux forming layers 3 at 250° C. which is equal to the Curie temperature of the TbFeCo storage layer 4, and Hrec denotes the strength of the recording magnetic field at which the CNR of the magnetic flux forming layers 3 reaches a saturation point according to its dependence on the recording magnetic field strength measured in the same manner as shown in FIG. 19. It would be seen from Table 1 that when the magnetic flux forming layer 3 contains Ho or Gd as a rare-earth metal component, Hc3 and Hrec are both reduced relative to the case of DyFeCo. Note that both Ho and Gd have a smaller perpendicular magnetic anisotropy factor than Dy.

TABLE 1

|  | Tc3 | Hc3 | Hrec |
| --- | --- | --- | --- |
| $Dy_{0.23}(Fe_{0.55}Co_{0.45})_{0.77}$ | 375° C. | 16.0 kA/m | 24.0 kA/m |
| $Ho_{0.27}(Fe_{0.35}Co_{0.65})_{0.73}$ | 340° C. | 3.2 kA/m | 8.8 kA/m |
| $(Ho_{0.25}Dy_{0.75})_{0.24}(Fe_{0.50}Co_{0.50})_{0.76}$ | 350° C. | 8.0 kA/m | 14.4 kA/m |
| $(Ho_{0.50}Tb_{0.50})_{0.25}(Fe_{0.45}Co_{0.55})_{0.75}$ | 365° C. | 9.6 kA/m | 17.6 kA/m |
| $(Gd_{0.25}Dy_{0.75})_{0.25}(Fe_{0.50}Co_{0.50})_{0.75}$ | 365° C. | 9.6 kA/m | 12.0 kA/m |
| $(Gd_{0.50}Dy_{0.50})_{0.25}(Fe_{0.55}Co_{0.45})_{0.75}$ | 375° C. | 10.4 kA/m | 12.8 kA/m |

In example 5, the magnetic flux forming layer 3 is composed of HoFeCo, HoDyFeCo, HoTbFeCo, GdDyFeCo, or GdTbFeCo; however, this does not deny other possibilities.

It would be seen from those results described above that according to the present invention, the use of an alloy of rare-earth and transition metals that produces a lower coercive force at the Curie temperature of the TbFeCo storage layer 4 than DyFeCo enables similar recording at low magnetic field strengths.

In example 5, we explained that the structure of example 3 can be used to perform recording at low magnetic field strengths, provided that Hc3 of the magnetic flux forming layer 3 is reduced and also that the structures of examples 1, 2, and 4 can be used to perform recording at even lower magnetic field strengths, provided that Hc3 of the magnetic flux forming layer 3 is reduced.

EXAMPLE 6

In example 6, experiments were conducted on the recording and reproduction characteristics of a super-resolution magneto-optical disk which has a similar structure to that of the super-resolution magneto-optical disk 28 described in example 4. The differences lie in the components making up the DyFeCo magnetic flux forming layer 3.

In the super-resolution magneto-optical disk 28 of example 4, the reproduction layer 1, the in-plane magnetized layer 8, the magnetic flux forming layer 3, the supplementary storage layer 7, and the storage layer 4 were composed respectively of GdFeCo, GdFe, DyFeCo, GdFeCo, and TbFeCo. Example 6 is identical to example 4, with the only exception that the component ratio of the DyFeCo magnetic flux forming layer 3 is varied in the former to examine the magnetic properties that the magnetic flux forming layer 3 should exhibit. No change is made to the other magnetic layers.

Table 2 shows Curie temperatures Tc3 and compensation temperatures Tcomp3 of various magnetic flux forming layers 3 with different component ratios

TABLE 2

|  | Composition | Tc3 | Tcomp3 |
| --- | --- | --- | --- |
| No. 1 | $Dy_{0.23}(Fe_{0.70}Co_{0.30})_{0.77}$ | 275° C. | 25° C. |
| No. 2 | $Dy_{0.23}(Fe_{0.65}Co_{0.35})_{0.77}$ | 300° C. | 25° C. |
| No. 3 | $Dy_{0.23}(Fe_{0.60}Co_{0.40})_{0.77}$ | 345° C. | 25° C. |
| No. 4 | $Dy_{0.23}(Fe_{0.55}Co_{0.45})_{0.77}$ | 375° C. | 25° C. |
| No. 5 | $Dy_{0.23}(Fe_{0.50}Co_{0.50})_{0.77}$ | 380° C. | 25° C. |
| No. 6 | $Dy_{0.23}(Fe_{0.45}Co_{0.55})_{0.77}$ | 385° C. | 25° C. |

TABLE 2-continued

|  | Composition | Tc3 | Tcomp3 |
| --- | --- | --- | --- |
| No. 7 | $Dy_{0.21}(Fe_{0.55}Co_{0.45})_{0.79}$ | 390° C. | −125° C. |
| No. 8 | $Dy_{0.22}(Fe_{0.55}Co_{0.45})_{0.78}$ | 385° C. | −50° C. |
| No. 9 | $Dy_{0.23}(Fe_{0.55}Co_{0.45})_{0.77}$ | 375° C. | 25° C. |
| No. 10 | $Dy_{0.24}(Fe_{0.55}Co_{0.45})_{0.76}$ | 360° C. | 100° C. |
| No. 11 | $Dy_{0.25}(Fe_{0.55}Co_{0.45})_{0.75}$ | 345° C. | 170° C. |

Figure 20:
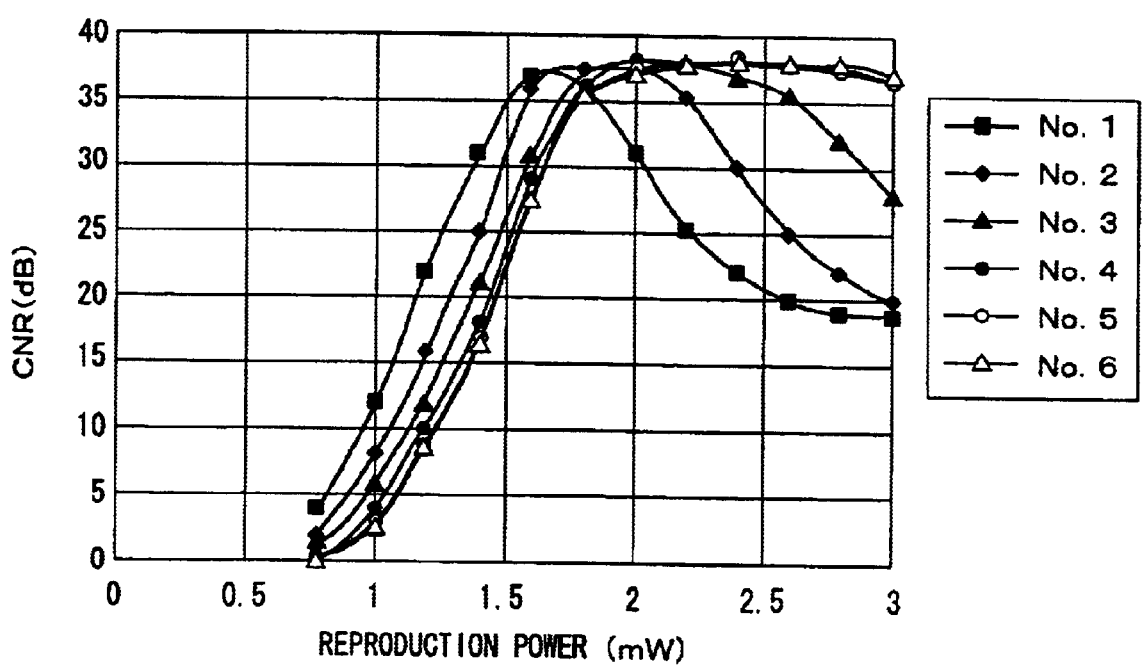
FIG. 20 is a graphical representation showing the reproduction power dependence of the CNRs of super-resolution magneto-optical disks incorporating magnetic flux forming layers 3 having various Fe:Co ratios.

Referring to Table 2, the super-resolution magneto-optical disks No. 1 to No. 6 share an equal RE:TM ratio, but have different Fe:Co ratios. FIG. 20 shows results of experiments which were conducted on the reproduction power dependence of the CNRs of No. 1 to No. 6 with a mark length of 0.3 μm under the same conditions as those in example 3.

A fall in the Curie temperature of the magnetic flux forming layer 3 brings down the temperature at which the net magnetization reaches its peak value. It would be hence understood that the lower the Curie temperature of the magnetic flux forming layer 3 included in the super-resolution magneto-optical disk, the lower the reproduction power at which the CNR starts increasing.

The super-resolution magneto-optical disk No. 1 included a DyFeCo magnetic flux forming layer 3 having a Curie temperature of 275° C., and exhibits reproduction power dependence similar to that of the super-resolution magneto-optical disk (CNR 33) which is a comparative example with no magnetic flux forming layer 3 as described in example 3 in reference to FIG. 17. So, the provision of the magnetic flux forming layer 3 led to any significant advantages. In contrast, the super-resolution magneto-optical disk No. 2 had a relatively large Co content to raise the Curie temperature of the DyFeCo magnetic flux forming layer 3 to 300° C., and exhibited a CNR of about 37 dB across a wider reproduction power range than the CNR of the super-resolution magneto-optical disk No. 1. So, the provision of the magnetic flux forming layer 3 did lead to an advantage of a wider reproduction power margin. Similar results were confirmed with the super-resolution magneto-optical disks No. 3 to No. 6 including magnetic flux forming layers 3 possessing various higher Curie temperatures. That is, the provision of the magnetic flux forming layers 3 led to an advantage of a wider reproduction power margin.

It would be seen from those results described above that the Curie temperature of the magnetic flux forming layer 3 is preferably 300° C. or higher.

Figure 21:
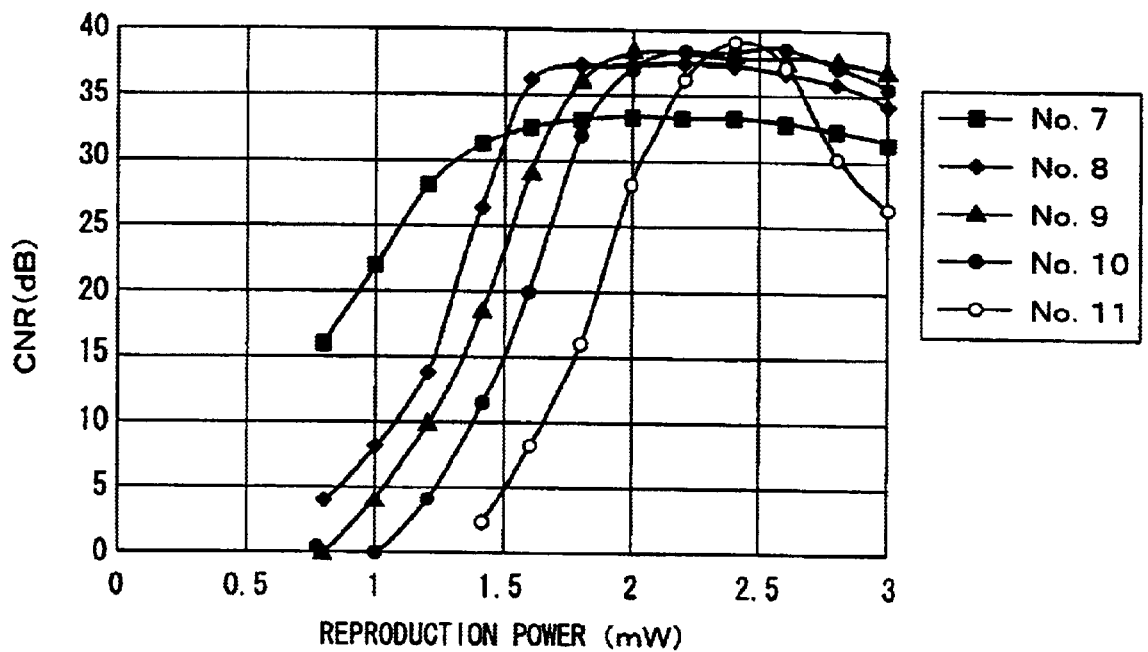
FIG. 21 is a graphical representation showing the reproduction power dependence of the CNRs of super-resolution magneto-optical disks incorporating magnetic flux forming layers 3 including rare-earth and transition metals in various ratios accordance with the present invention.

Referring to Table 2, the super-resolution magneto-optical disks No. 7 to No. 11 share an equal Fe:Co ratio, but have different RE:TM ratios. FIG. 21 shows results of experiments which were conducted on the reproduction power dependence of the CNRs of No. 7 to No. 11 with a mark length of 0.3 μm under the same conditions as those in example 3.

Since the alloy of rare-earth and transition metals shows ferrimagnetism, it exhibits a zero net magnetization at the compensation temperature. If temperature rises further, the net magnetization grows. The super-resolution magneto-optical disk No. 7 possesses a compensation temperature of −125° C., and the magnetic flux forming layer 3 included therein shows too large a net magnetization around ambient temperature, which leads to poor reproduction resolution. Therefore, the CNR of No. 7 is 33 dB even at its maximum, which is too low a value to enable satisfactory reproduction. In contrast, Table 2 shows that the super-resolution magneto-optical disks Nos. 8, 9, and 10 had compensation temperature of −50° C., 25° C., and 100° C. respectively, and successfully produced CNRs of about 37 dB and wider reproduction power margins. Meanwhile, the super-resolution magneto-optical disk No. 11, which had a compensation temperature of 170° C., successfully produced a CNR as high as about 39 dB, but led to too narrow a reproduction power margin to perform stable reproduction.

It would be seen from those results described above that the compensation temperature of the magnetic flux forming layer 3 is preferably in a range of from −50° C. to 100° C.

EXAMPLE 7

In the foregoing examples, the reproduction layer 1 included in the super-resolution magneto-optical storage medium was composed of an alloy of rare-earth and transition metals and showed RE-rich attributes such that the layer exhibited in-plane magnetization at room temperature, changed to perpendicular magnetization as temperature rose exceeding a critical temperature, and remained in that state above the critical temperature. However, as mentioned earlier, the present invention is applicable to any super-resolution magneto-optical storage medium in which the reproduction layer 1 is magnetostatically coupled to the storage layer 4 at least when temperature rises (i.e., during reproduction).

Figure 22:
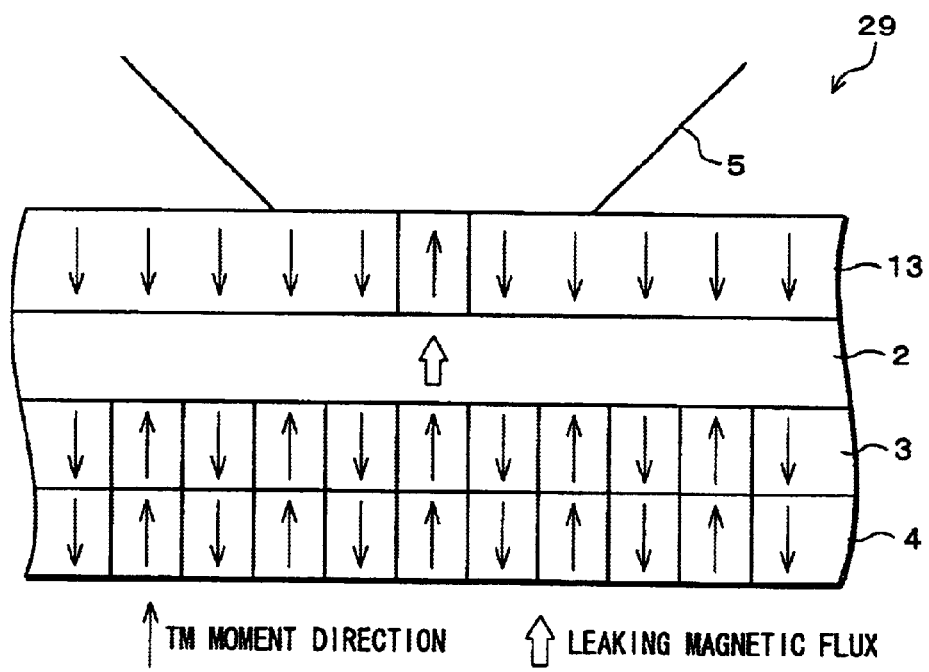
FIG. 22 is a cross-sectional view showing magnetization to illustrate reproduction principles of a super-resolution magneto-optical storage medium of example 7.

FIG. 22 is an illustration showing in a cross-sectional view magnetization of a super-resolution magneto-optical storage medium 29. The super-resolution magneto-optical storage medium 29 includes, among other things, a super-resolution magneto-optical storage medium including a second reproduction layer 13 which is magnetostatically coupled to the magnetic flux forming layer 3 and the storage layer 4 in accordance with the present invention. The second reproduction layer 13 is TM-rich and exhibits perpendicular magnetization at room temperature and has a compensation temperature around room temperature (in other words, the second reproduction layer 13 exhibits perpendicular magnetization from room temperature up to Curie temperature).

Figure 23:
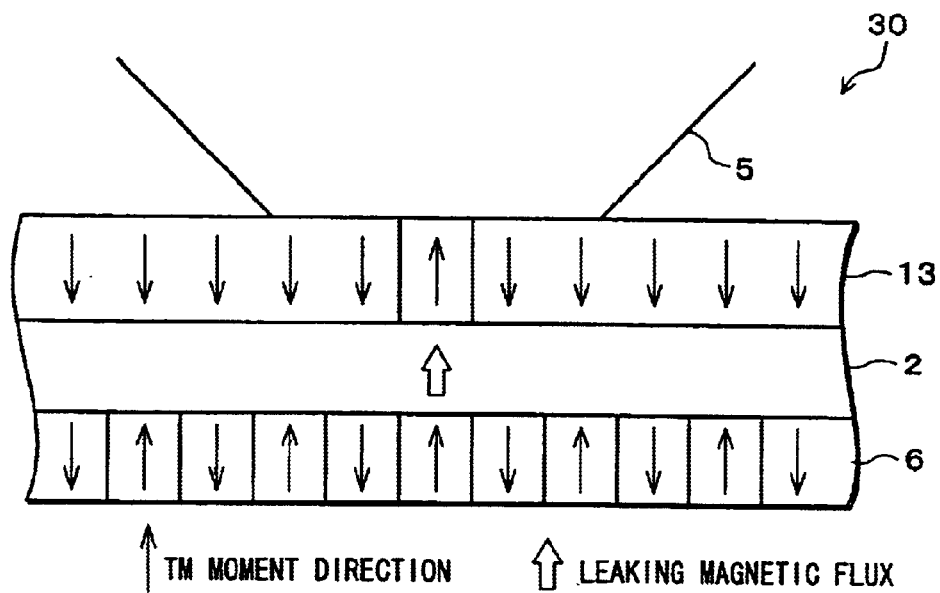
FIG. 23 is a cross-sectional view showing magnetization to illustrate reproduction principles of a conventional super-resolution magneto-optical storage medium.

In contrast, FIG. 23 shows in a cross-sectional view magnetization of a super-resolution magneto-optical storage medium 30 disclosed in Tokukaihei 8-180486/1996. The super-resolution magneto-optical storage medium 30 is constituted by a second reproduction layer 13, a non-magnetic intermediate layer 2, and a storage layer 6, which layers are stacked in this order. The second reproduction layer 13 is TM-rich, exhibits perpendicular magnetization at room temperature, and has a compensation temperature around room temperature. The storage layer 6 and the second reproduction layer 13 are magnetostatically coupled via the leaking magnetic flux arising from the storage layer 6 and the net magnetization produced by the second reproduction layer 13. The coupling allows magnetization in a part of the storage layer 6 where temperature is elevated to be copied to the second reproduction layer 13, so as to preform super-resolution reproduction. In this case, since the second reproduction layer 13 is TM-rich, the TM moment copied onto the second reproduction layer 13 is opposite in direction to the TM moment copied onto the RE-rich reproduction layer 1.

It is preferred that the second reproduction layer 13 produces increased magnetization around a reproduction temperature, since it will reinforce the magnetostatic coupling between the magnetic flux forming layer 3 and the storage layer 4 during reproduction. Accordingly, the second reproduction layer 13 is desirably such that it has a compensation temperature around room temperature and produces a peak magnetization around a reproduction temperature as mentioned above.

Figure 24:
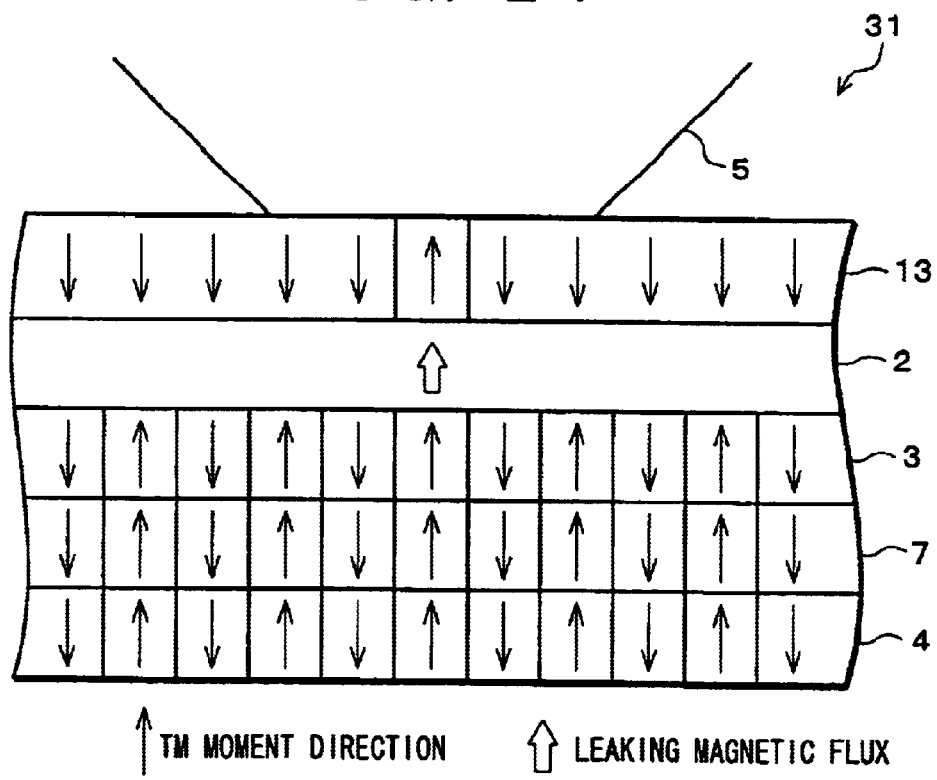
FIG. 24 is a cross-sectional view showing magnetization to illustrate reproduction principles of a super-resolution magneto-optical storage medium of example 7, which has a different structure from the foregoing ones.

The storage layer 6 plays dual roles of storing information and of producing a leaking magnetic flux to establish magnetostatic coupling in the super-resolution magneto-optical storage medium 30 shown in FIG. 23. This also holds true in the super-resolution magneto-optical disk which is a comparative example of example 1. Therefore, replacing the storage layer 6 for the magnetic flux forming layer 3 and the storage layer 4 as shown in FIG. 22 enables stable magnetostatic coupling, leads to a wide reproduction power margin, and eventually imparts satisfactory recording characteristics. Further, providing a supplementary storage layer 7 as in the super-resolution magneto-optical storage medium 31 of FIG. 24 leads to a wide reproduction power margin, imparts satisfactory recording characteristics, and enables recording at low magnetic field strengths. The magnetic flux forming layer 3 used here may be one of those described in the foregoing embodiments and examples.

Incidentally, to perform super-resolution reproduction on the magneto-optical disk 29 of the present example, the directions of magnetization in all the parts of the second reproduction layer 13 other than a part in which temperature is elevated to establish magnetostatic coupling are aligned to the direction corresponding to the direction of the reproduction magnetic field, while applying a reproduction magnetic field where light beam is projected, before magnetization is copied only to the high temperature part, for example.

The magneto-optical storage medium and recording method thereof described so far may be alternatively described as follows.

A first magneto-optical storage medium in accordance with the present invention includes:

a first magnetic layer constituted by a perpendicularly magnetized film;

a second magnetic layer constituted by a perpendicularly magnetized film so as to be exchange coupled to the first magnetic layer; and a third magnetic layer magnetostatically coupled to the first and second magnetic layers at elevated temperatures, magnetization of the first magnetic layer being copied to the third magnetic layer, wherein the second magnetic layer is specified to produce a greater peak net magnetization and have a higher Curie temperature than the first magnetic layer.

A second magneto-optical storage medium in accordance with the present invention incorporates all the features of the first magneto-optical storage medium in accordance with the present invention, and further includes a fourth magnetic layer, provided directly on either the first magnetic layer or the second magnetic layer, or both, which has a smaller perpendicular magnetic anisotropy than the first and second magnetic layers and a higher Curie temperature than the first magnetic layer.

A third magneto-optical storage medium in accordance with the present invention incorporates all the features of either the first or second magneto-optical storage medium in accordance with the present invention, and is such that the second magnetic layer is specified to produce peak net magnetization at a higher temperature than is the first magnetic layer.

A fourth magneto-optical storage medium in accordance with the present invention incorporates all the features of any one of the first to third magneto-optical storage media in accordance with the present invention, and is such that the second magnetic layer is specified to have a lower compensation temperature than is the first magnetic layer.

A fifth magneto-optical storage medium in accordance with the present invention incorporates all the features of any one of the first to fourth magneto-optical storage media in accordance with the present invention, and is such that the third magnetic layer is constituted by a magnetic film which exhibits in-plane magnetization at room temperature and which changes to perpendicular magnetization at a critical temperature.

A sixth magneto-optical storage medium in accordance with the present invention incorporates all the features of any one of the first to fourth magneto-optical storage media in accordance with the present invention, and is such that the third magnetic layer exhibits perpendicularly magnetization from room temperature up to Curie temperature.

A seventh magneto-optical storage medium in accordance with the present invention incorporates all the features of the fifth magneto-optical storage medium in accordance with the present invention, and is such that the second magnetic layer produces peak net magnetization at a higher temperature than the critical temperature.

An eighth magneto-optical storage medium in accordance with the present invention incorporates all the features of any one of the first to seventh magneto-optical storage media in accordance with the present invention, and is such that the second magnetic layer has a compensation temperature in a range of from −50° C. to 100° C.

A ninth magneto-optical storage medium in accordance with the present invention incorporates all the features of any one of the first to eighth magneto-optical storage media in accordance with the present invention, and is such that the second magnetic layer is composed of an alloy selected from the group consisting of DyFeCo, HoFeCo, HoDyFeCo, HoTbFeCo, GdDyFeCo, and GdTbFeCo, and the first magnetic layer is composed of TbFeCo.

A method of recording information on any one of the first to ninth magneto-optical storage media in accordance with the present invention includes the step of heating the first magnetic layer up to the Curie temperature thereof, while applying a magnetic field thereto.

In the magneto-optical storage medium in accordance with the present invention, magnetostatic coupling forces grow between the third magnetic layer (reproduction layer) and the second magnetic layer (magnetic flux forming layer) and also between the third magnetic layer (reproduction layer) and the first magnetic layer (storage layer). Therefore, the magneto-optical medium is capable of stably copying a weaker magnetization in a magnetic recording domain to the third magnetic layer (reproduction layer) and reproduce information stored therein. A wider reproduction power margin is thus achieved. Besides, since the second magnetic layer (magnetic flux forming layer) serves to produce a leaking magnetic flux to establish magnetostatic coupling to the third magnetic layer (reproduction layer), the reproduction power margin is further expanded, and the superresolution magneto-optical disk is realized with satisfactory recording capabilities.

The additional provision of a fourth magnetic layer (supplementary storage layer) enables recording at low magnetic field strengths.

According to the method of recording the magneto-optical storage medium in accordance with the present invention, satisfactory recording is performed at low magnetic field strengths.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical storage medium, comprising:
    a first magnetic layer constituted by a perpendicularly magnetized film;
    a second magnetic layer constituted by a perpendicularly magnetized film so as to be exchange coupled to the first magnetic layer; and
    a third magnetic layer magnetostatically coupled to the first and second magnetic layers at elevated temperatures, magnetization of the first magnetic layer being copied to the third magnetic layer,
    wherein
        the second magnetic layer has a higher Curie temperature than the first magnetic layer, and produces a leaking magnetic flux.

2. The magneto-optical storage medium as set forth in claim 1, further comprising
    a fourth magnetic layer, provided directly on at least either the first magnetic layer or the second magnetic layer, which has a smaller perpendicular magnetic anisotropy than the first and second magnetic layers and a higher Curie temperature than the first magnetic layer.

3. The magneto-optical storage medium as set forth in claim 1,
    wherein
        the second magnetic layer is specified to produce peak net magnetization at a higher temperature than is the first magnetic layer.

4. The magneto-optical storage medium as set forth in claim 1,
    wherein
        the second magnetic layer produces a greater peak net magnetization than does the first magnetic layer.

5. The magneto-optical storage medium as set forth in claim 1,
    wherein:
        the first magnetic layer is specified to have a compensation temperature above room temperature, and;
        the second magnetic layer is specified to have a lower compensation temperature than the first magnetic layer.

6. The magneto-optical storage medium as set forth in claim 1,
    wherein
        the first magnetic layer is specified to have a compensation temperature in a range of from 50° C. to 200° C.

7. The magneto-optical storage medium as set forth in claim 1,
    wherein
        the first magnetic layer is specified to have a thickness in a range of from 10 nm to 40 nm.

8. The magneto-optical storage medium as set forth in claim 1,
    wherein
        the second magnetic layer and the third magnetic layer are spaced as closely to each other as possible.

9. The magneto-optical storage medium as set forth in claim 1, wherein
the third magnetic layer is constituted by a magnetic film which exhibits in-plane magnetization at room temperature and which changes to perpendicular magnetization at a critical temperature.

10. The magneto-optical storage medium as set forth in claim 1,
wherein
the third magnetic layer exhibits perpendicularly magnetization from room temperature up to Curie temperature.

11. The magneto-optical storage medium as set forth in claim 9,
wherein
the second magnetic layer produces peak net magnetization at a higher temperature than the critical temperature of the third magnetic layer.

12. The magneto-optical storage medium as set forth in claim 1,
wherein
the second magnetic layer has a compensation temperature in a range of from −50° C. to 100° C.

13. The magneto-optical storage medium as set forth in claim 1,
wherein
the second magnetic layer is specified to have a thickness in a range of from 20 nm to 80 nm.

14. The magneto-optical storage medium as set forth in claim 1,
wherein:
the second magnetic layer is composed of an alloy selected from the group consisting of DyFeCo, HoFeCo, HoDyFeCo, HoTbFeCo, GdDyFeCo, and GdTbFeCo; and
the first magnetic layer is composed of TbFeCo.

15. The magneto-optical storage medium as set forth in claim 1,
wherein
the second magnetic layer is specified to have a Curie temperature of not lower than 300° C.

16. The magneto-optical storage medium as set forth in claim 2,
wherein
the fourth magnetic layer is so provided that the second magnetic layer and the third magnetic layer are spaced as closely to each other as possible.

17. The magneto-optical storage medium as set forth in claim 1, further comprising:
a fifth magnetic layer, provided directly on the third magnetic layer, which has a Curie temperature around the critical temperature at which the third magnetic layer changes to perpendicular magnetization.

18. The magneto-optical storage medium as set forth in claim 17,
wherein
the fifth magnetic layer and a light-entering surface are intervened by the third magnetic layer.

19. The magneto-optical storage medium as set forth in claim 1, further comprising:
a fourth magnetic layer, provided directly on at least either the first magnetic layer or the second magnetic layer, which has a smaller perpendicular magnetic anisotropy than the first and second magnetic layers and a higher Curie temperature than the first magnetic layer; and
a fifth magnetic layer, provided directly on either one of sides of the third magnetic layer, which has a Curie temperature around the critical temperature at which the third magnetic layer changes to perpendicular magnetization.

20. The magneto-optical storage medium as set forth in claim 19,
wherein
the second and third magnetic layers are spaced as closely to each other as possible.

21. A method of recording information on the magneto-optical storage medium as set forth in claim 1, comprising the step of:
heating the first magnetic layer up to the Curie temperature thereof, while applying a magnetic field thereto.

22. A magneto-optical storage medium, comprising:
a reproduction layer which exhibits in-plane magnetization at room temperature and changes perpendicular magnetization at a temperature equal to, or higher than, a predetermined temperature;
a storage layer, for storing magnetic information, which is magnetostatically coupled to the reproduction layer; and
a magnetic flux forming layer for producing a leaking magnetic flux so as to be magnetostatically coupled to the reproduction layer, the magnetic flux forming layer being exchange coupled to the storage layer.

23. The magneto-optical storage medium as set forth in claim 22,
wherein
the magnetic flux forming layer produces net magnetization which is at least great enough to compensate for a loss of magnetization in the storage layer.

24. The magneto-optical storage medium as set forth in claim 23,
wherein
the magnetic flux forming layer has a higher Curie temperature than the storage layer.

25. The magneto-optical storage medium as set forth in claim 24,
wherein
the magnetic flux forming layer produces a greater peak net magnetization at a higher temperature than the storage layer.

26. The magneto-optical storage medium as set forth in claim 22,
wherein
the magnetic flux forming layer has a lower compensation temperature than the storage layer.

27. The magneto-optical storage medium as set forth in claim 22,
wherein
the magnetic flux forming layer produces peak net magnetization at a temperature higher than the predetermined temperature of the reproduction layer.

28. The magneto-optical storage medium as set forth in claim 22,
wherein
the magnetic flux forming layer and the reproduction layer are spaced as closely to each other as possible.

29. The magneto-optical storage medium as set forth in claim 22, further comprising
a supplementary storage layer which has a higher Curie temperature than the storage layer and a smaller perpendicular magnetic anisotropy than the storage layer and the magnetic flux forming layer,
wherein the supplementary storage layer is exchange coupled to the magnetic flux forming layer above the Curie temperature of the storage layer.

30. The magneto-optical storage medium as set forth in claim 22, further comprising an in-plane magnetized layer which has a Curie temperature around a temperature at which the reproduction layer changes to perpendicular magnetization.

31. The magneto-optical storage medium as set forth in claim 29, further comprising an in-plane magnetized layer which has a Curie temperature around a temperature at which the reproduction layer changes to perpendicular magnetization.

* * * * *